US011019960B1

(12) United States Patent
Wilson et al.

(10) Patent No.: US 11,019,960 B1
(45) Date of Patent: Jun. 1, 2021

(54) APPARATUS AND METHOD FOR PREPARING COOKED FOOD

(71) Applicant: Roboburger Enterprises, Jersey, NJ (US)

(72) Inventors: Audley Wilson, Jersey City, NJ (US); Dan Braido, Jersey City, NJ (US); Andrew Siegel, Jersey City, NJ (US)

( * ) Notice: Subject to any disclaimer, the term of this patent is extended or adjusted under 35 U.S.C. 154(b) by 0 days.

(21) Appl. No.: 16/780,131

(22) Filed: Feb. 3, 2020

(51) Int. Cl.
*A47J 44/00* (2006.01)
*A47J 37/04* (2006.01)
*A47J 43/28* (2006.01)

(52) U.S. Cl.
CPC ........... *A47J 37/044* (2013.01); *A47J 37/049* (2013.01); *A47J 43/288* (2013.01); *A47J 44/00* (2013.01)

(58) Field of Classification Search
USPC .................................. 99/357, 348, 451, 468
See application file for complete search history.

(56) References Cited

U.S. PATENT DOCUMENTS

| | | | | |
|---|---|---|---|---|
| 3,215,062 A | * | 11/1965 | Frankenberg | A21C 5/006 99/353 |
| 3,314,198 A | * | 4/1967 | Frisk | E04H 15/22 52/2.14 |
| 3,386,550 A | * | 6/1968 | Murray | G07F 17/0078 194/221 |
| 4,687,119 A | * | 8/1987 | Juillet | G07F 9/105 221/101 |
| 4,700,617 A | * | 10/1987 | Lee | A47J 27/14 134/115 R |
| 4,733,608 A | * | 3/1988 | Merdy | A21B 5/03 99/353 |
| 4,922,435 A | | 5/1990 | Cahlander et al. | |
| 4,972,766 A | * | 11/1990 | Anetsberger | A47J 37/0611 219/524 |
| 5,132,914 A | | 7/1992 | Cahlander et al. | |
| 5,137,740 A | * | 8/1992 | Benson | A47J 37/1214 426/438 |
| 5,172,328 A | | 12/1992 | Cahlander et al. | |
| 5,927,184 A | * | 7/1999 | Hermansson | A47J 37/0611 99/349 |

(Continued)

FOREIGN PATENT DOCUMENTS

| | | |
|---|---|---|
| CN | 202440044 U | 9/2012 |
| EP | 1415937 A1 | 6/2004 |

(Continued)

*Primary Examiner* — Tu B Hoang
*Assistant Examiner* — Masahiko Muranami
(74) *Attorney, Agent, or Firm* — The Plus IP Firm; Derek Fahey

(57) ABSTRACT

An apparatus for cooked food includes a spatula assembly defining a plate having a plate first end portion, a plate second end portion, a plate cooking surface and a plate non-cooking surface. The plate first end portion is pivotally in attachment with a spatula assembly cross member of the spatula assembly. The plate is configured to move between a plate upper position and a plate lower position. The apparatus further includes a movable wiper assembly defining an elongated body having a movable wiper cleaning surface along the elongated body. The movable wiper assembly is positioned proximate to the plate and configured to have the movable wiper cleaning surface move across the plate cooking surface when plate is in the plate lower position.

9 Claims, 45 Drawing Sheets

(56) References Cited

U.S. PATENT DOCUMENTS

| | | |
|---|---|---|
| 8,820,219 B2 | 9/2014 | Buehler |
| 9,788,687 B2 | 10/2017 | Frehn et al. |
| 10,354,479 B2 | 7/2019 | Huang |
| 2005/0193901 A1 | 9/2005 | Buehler |
| 2009/0123624 A1* | 5/2009 | Missakian ............. A47J 43/283 |
| | | 426/523 |
| 2010/0303972 A1 | 12/2010 | Srivastava |
| 2015/0150413 A1* | 6/2015 | Lee ...................... A47J 37/067 |
| | | 99/424 |
| 2015/0290795 A1 | 10/2015 | Oleynik |
| 2016/0045068 A1* | 2/2016 | Sands ..................... A21B 3/16 |
| | | 134/6 |
| 2016/0235239 A1 | 8/2016 | Patadia |
| 2016/0309956 A1* | 10/2016 | Glucksman ........... A47J 37/047 |
| 2017/0290345 A1 | 10/2017 | Garden et al. |
| 2018/0338639 A1 | 11/2018 | Lee et al. |
| 2018/0360269 A1* | 12/2018 | Sands ................. A47J 37/0786 |
| 2019/0075970 A1* | 3/2019 | Patterson ................ A47F 10/06 |
| 2019/0208957 A1 | 7/2019 | Almblad |
| 2019/0298104 A1* | 10/2019 | Balsamo .............. A47J 37/0611 |
| 2020/0030966 A1* | 1/2020 | Hasegawa ............ B25J 11/0045 |

FOREIGN PATENT DOCUMENTS

| | | |
|---|---|---|
| ES | 2361850 | 7/2007 |
| WO | 2019218548 A1 | 12/2017 |

\* cited by examiner

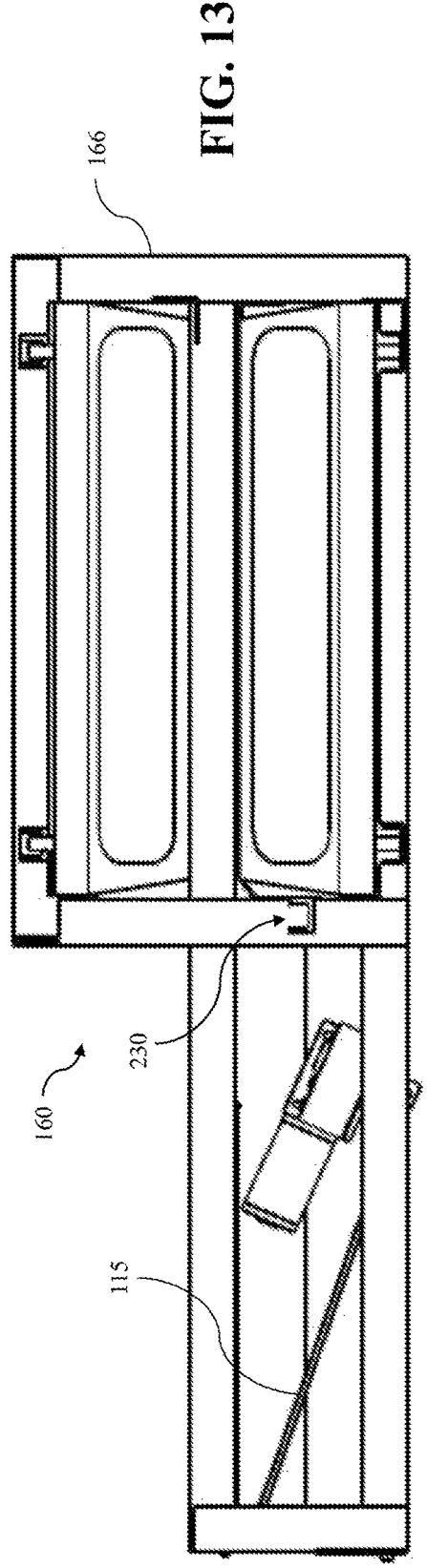
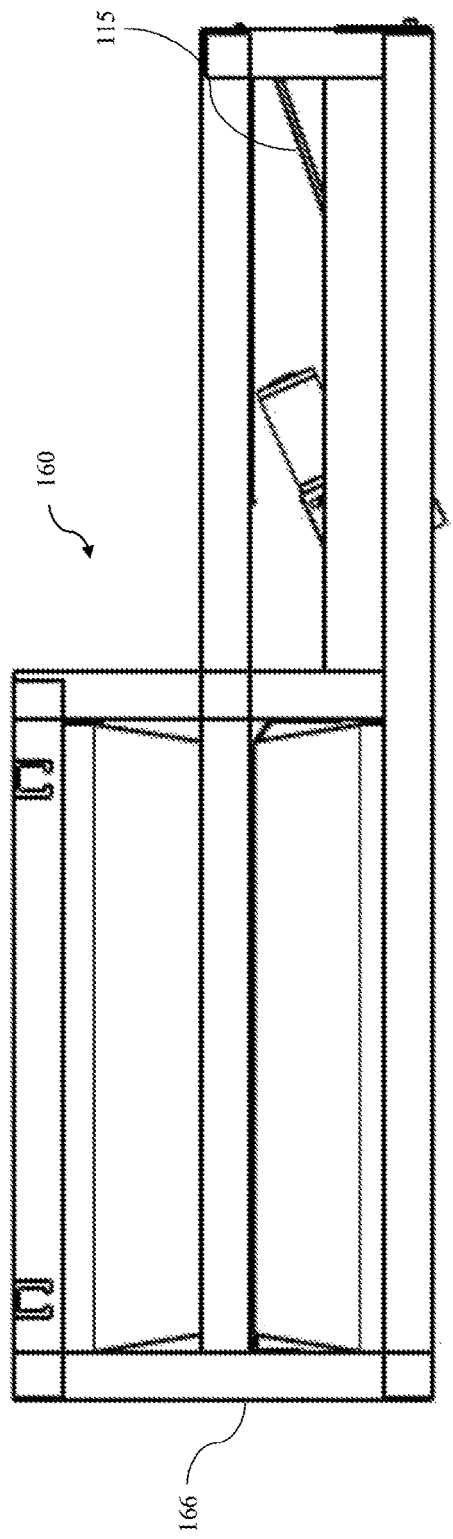

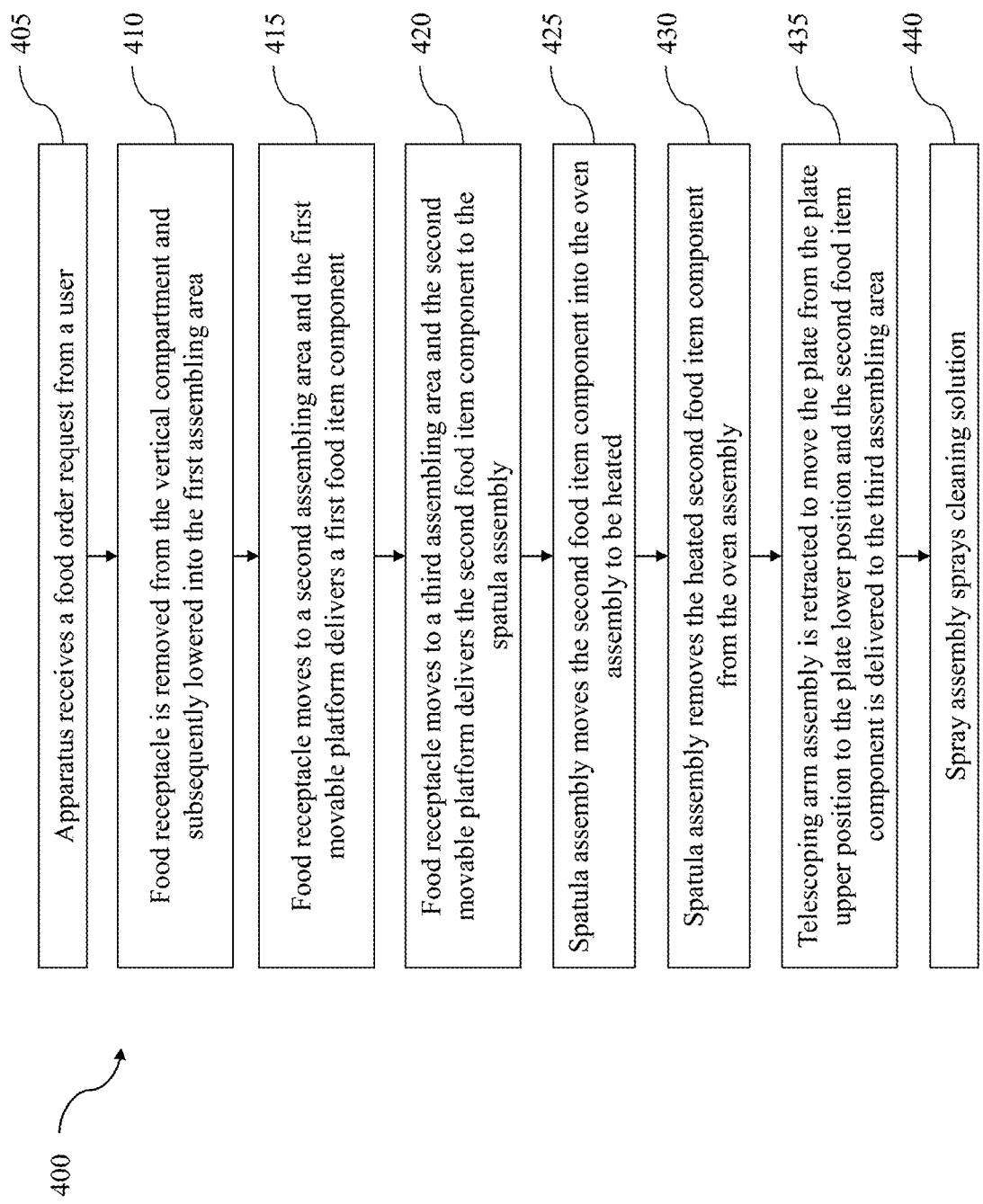

APPARATUS AND METHOD FOR PREPARING COOKED FOOD

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of food preparation, and more specifically to the field of automated food preparation devices.

BACKGROUND

Safe food supplies support national economies, trade and tourism, contribute to food and nutrition security, and underpin sustainable development. However, foodborne diseases encompassing a wide spectrum of illnesses are a growing public health problem worldwide. Foodborne diseases account for an estimated 76 million illnesses, 350,000 hospitalizations and 5,000 deaths every year in the United States, according to the Centers for Disease Control and Prevention. Moreover, according to the World Health Organization (WHO), an estimated 600 million people—almost 10 percent of the global population—fall ill after eating contaminated food.

Protecting the public from the degrees of the harmfulness of contaminated foods has become a daunting task. Automated food preparation devices are being increasingly used in the food industry as a means of preventing food contamination. Although automated food preparation devices have potential food safety benefits such as the need for fewer workers reducing the risk of contamination through manual handling, the implementation of suitable procedures to clean and sanitize the automated food preparation devices is necessary.

For example, it is essential to increase awareness among service operators about the risks related to human factors. While it cannot be overemphasized that clean, sanitary workers are necessary to produce clean, healthy food products, it is estimated in general society that between 30 percent and 50 percent of persons do not wash their hands after using the restroom. Therefore, service operators must be fully trained on sanitizing hands, using clean garments intended for food processing, and wearing disposable gloves, shoe covers and hats, especially when dealing with highly perishable foods. Training is also fundamental to learn how to maintain the device so as to minimize the occurrence of accidental contamination due to a lack of awareness among service operators.

Even if an automated food preparation device is properly cleaned, however, it will not prevent biofilms from forming on food-contact surfaces during the time span in between cleanings. Biofilms are surface-attached microbial communities with distinct properties, which have a tremendous impact on public health and food safety. Specifically, biofilms act as a persistent source of contamination because a wide variety of foodborne pathogens are able to attach, colonize, and form biofilms, such as the O157- and non-O157 Shiga toxin-producing *E. coli* (STEC), *S. enterica*, and *L. monocytogenes*, etc.

Given the impact of human factors, a need exists to improve over the prior art and more particularly, for a self-cleaning automated food preparation device to reduce the risk of food-borne diseases and contamination.

SUMMARY

An apparatus and method for preparing cooked food is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an apparatus for cooked food is disclosed. The apparatus includes a spatula assembly defining a plate having a plate first end portion, a plate second end portion, a plate cooking surface and a plate non-cooking surface. The plate first end portion is pivotally in attachment with a spatula assembly cross member of the spatula assembly. The plate is configured to move between a plate upper position and a plate lower position. The apparatus further includes a movable wiper assembly defining an elongated body having a movable wiper cleaning surface along the elongated body. The movable wiper assembly is positioned proximate to the plate and configured to have the movable wiper cleaning surface move across the plate cooking surface when plate is in the plate lower position.

In one embodiment, an apparatus for cooked food is disclosed. The apparatus includes a spatula assembly defining a plate having a plate first end portion, a plate second end portion, a plate cooking surface and a plate non-cooking surface. The plate first end portion is pivotally in attachment with a spatula assembly cross member. The plate is configured to move between a plate upper position and a plate lower position. A telescoping arm assembly is movably engaged with the plate non-cooking surface. The telescoping arm assembly is configured to move the plate between the plate upper position and the plate lower position. The apparatus further includes a movable wiper assembly defining an elongated body having a movable wiper cleaning surface along the elongated body. The movable wiper assembly is positioned proximate to the plate and configured to have the movable wiper cleaning surface move across the plate cooking surface when plate is in the plate lower position. At least one controller is configured for controlling electrical and mechanical components of the apparatus. The apparatus further includes at least one assembling area. A conveyor system is located above each assembling area for storing and delivering a food item component to one of a plurality of the assembling areas. The conveyor system includes a plurality of vertically stacked movable platforms. Each movable platform is formed by a pair of movable doors configured to have at least one of said doors move open at a conveyer system bottom end portion such that the food item component moves into the assembling area below the conveyer system. The apparatus further includes a pickup area having a pickup area first element configured to receive a least a fully assembled cooked food item, a pickup area second element configured to allow the fully assembled cooked food item to be picked up by a consumer, and a pickup area third element configured to allow the fully assembled cooked food item to move to a disposal area. The disposal area includes a disposal area first portion and is positioned relative to the pickup area third element so that a fully assembled cooked food item may exit the pickup area third element and into the disposal area first portion when the pickup area third element is in an open configuration. The at least one controller is configured to receive a first signal indicating that a fully assembled cooked food item is in the pickup area and has not been removed by a consumer within a preprogrammed amount of time. The at least one controller is also configured to receive a second signal before the first signal if a fully assembled cooked food condition is not satisfied. The at least one controller is also configured to send a disposal signal to cause the fully assembled cooked food item to move to the disposal area if either of the first signal and second signal is received.

In one embodiment, a method for preparing cooked food item is disclosed. The method includes moving a first food item component from a first conveyance system to a first assembling area. The method further includes moving the first food item component into an oven and at least heating the first food item component. The method further includes moving the at least heated first food item component out of the oven and cleaning at least one cooking surface with at least one wiper after at least heating the first food item component.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 13 is a front view of an oven assembly, according to an example embodiment of the present invention;

FIG. 14 is a rear view of an oven assembly, according to an example embodiment of the present invention;

FIG. 52 is a flowchart describing the steps of the process for preparing a cooked food item, according to an example embodiment of the present invention;

DETAILED DESCRIPTION

Figure 1:
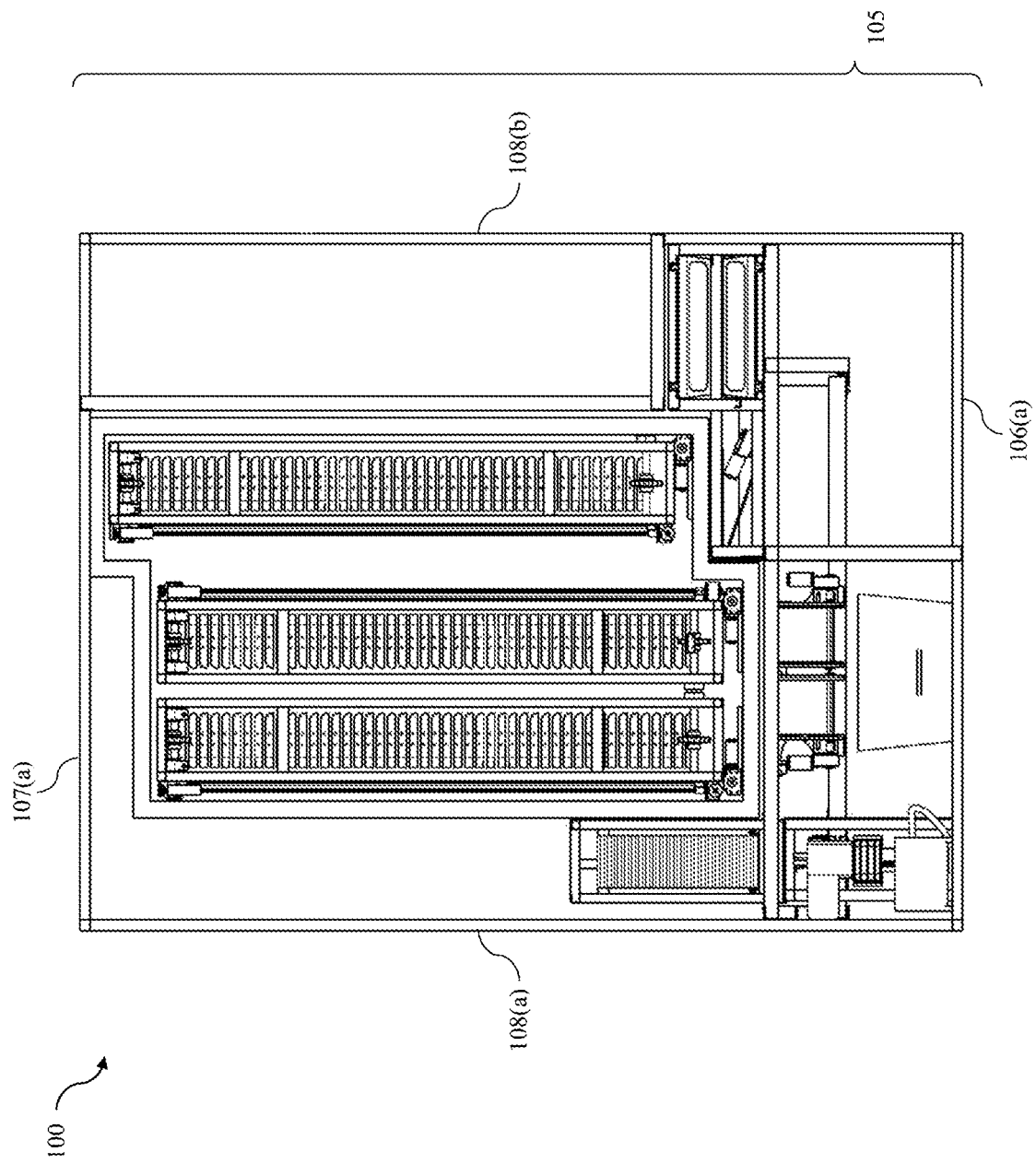
FIG. 1 is a front view of an apparatus for preparing a cooked food item, according to an example embodiment of the present invention.
Figure 2:
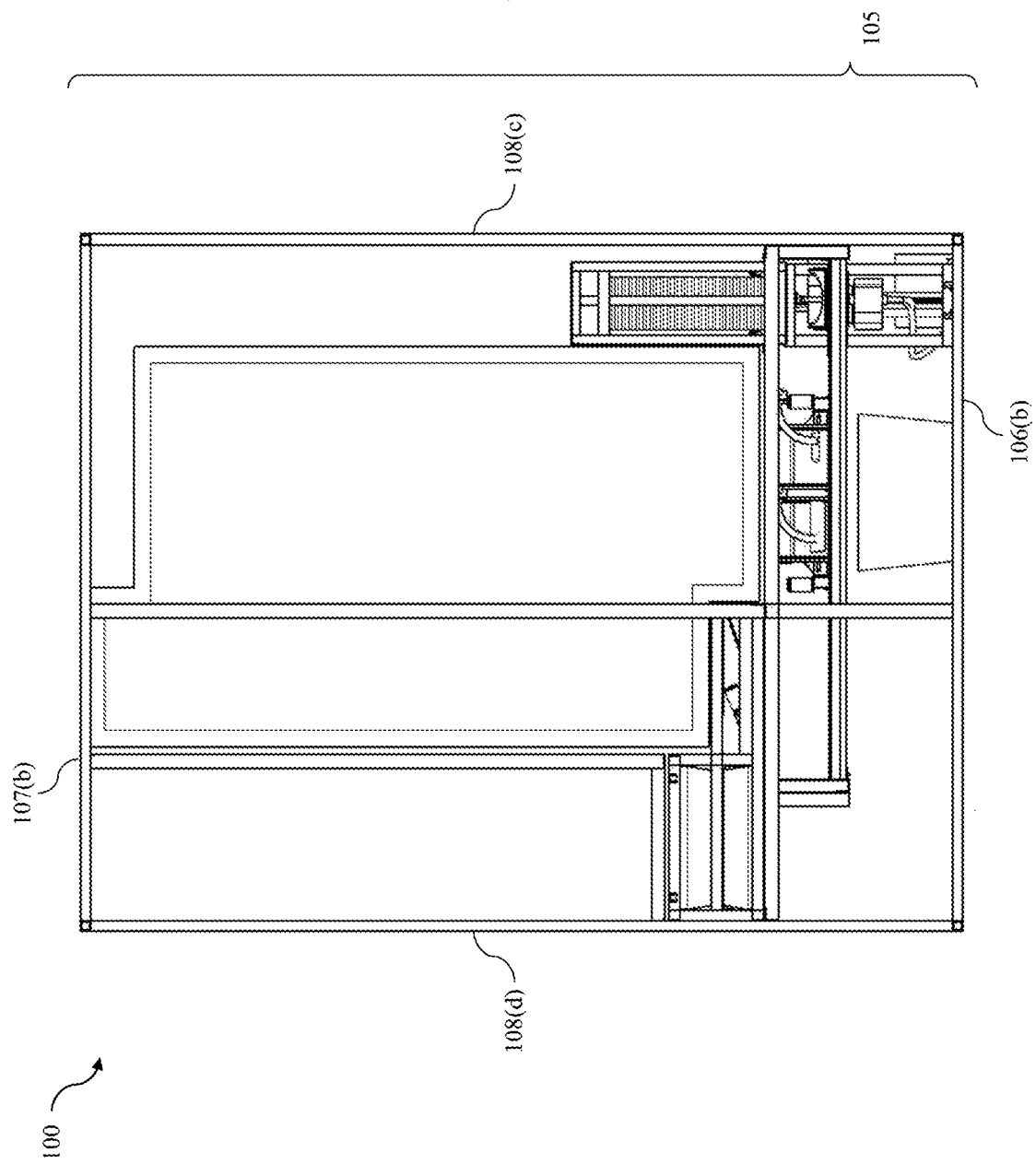
FIG. 2 is a rear view of an apparatus for preparing a cooked food item, according to an example embodiment of the present invention.
Figure 3:
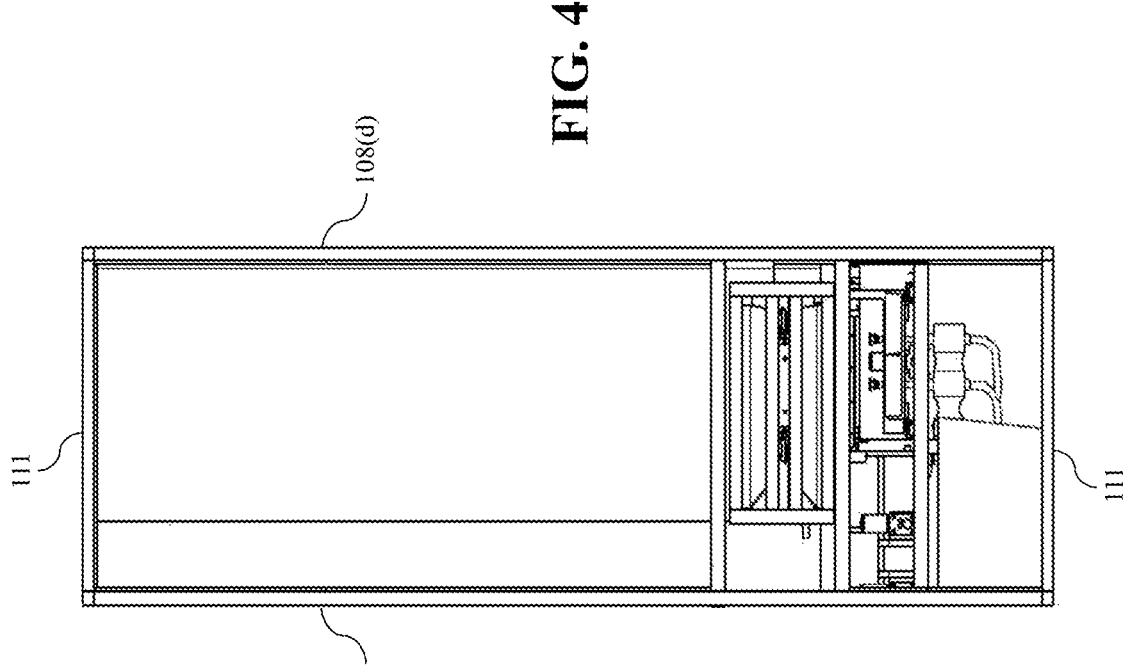
FIG. 3 is a right-side view of an apparatus for preparing a cooked food item, according to an example embodiment of the present invention.
Figure 4:
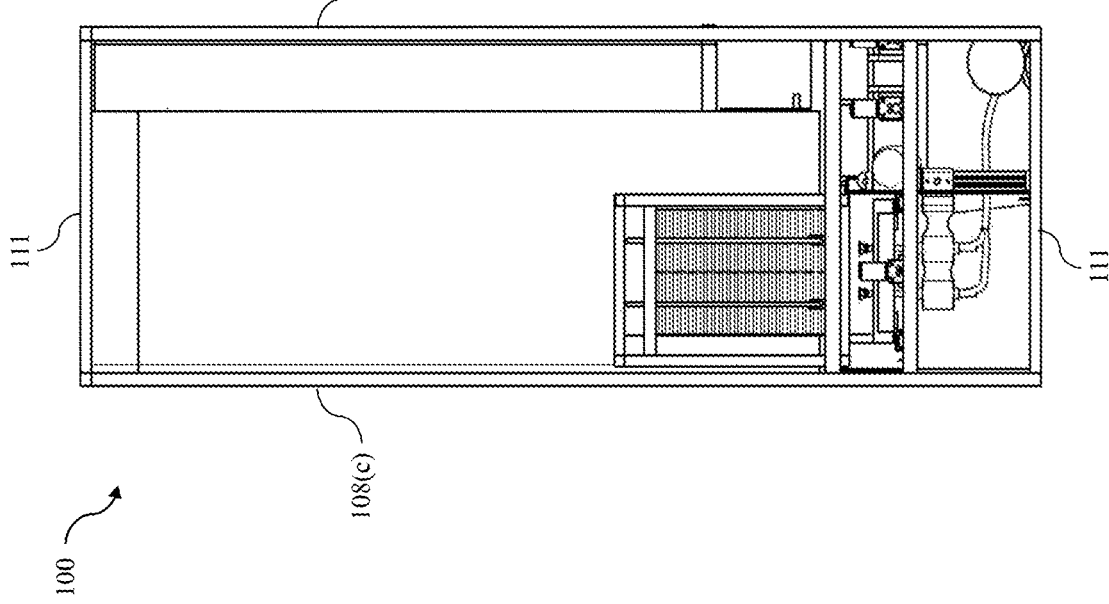
FIG. 4 is a left-side view of an apparatus for preparing a cooked food item, according to an example embodiment of the present invention.
Figure 6:
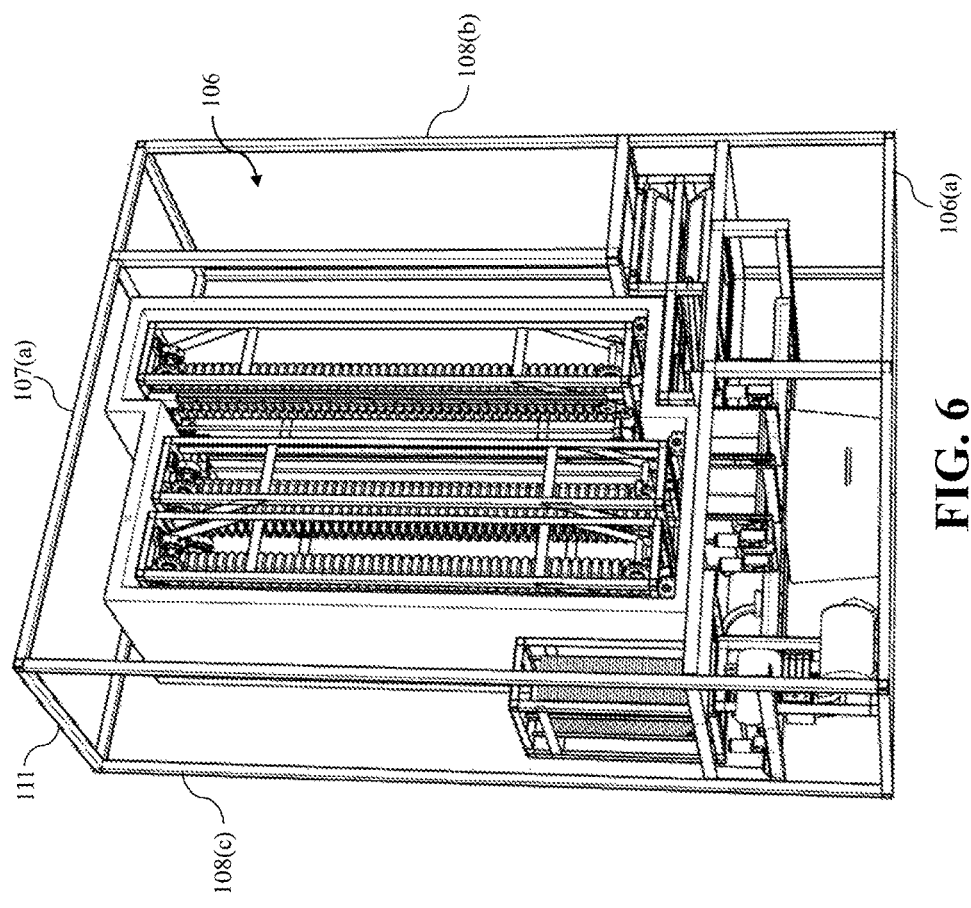
FIG. 6 is a bottom perspective front view of an apparatus for preparing a cooked food item, according to an example embodiment of the present invention.
Figure 5:
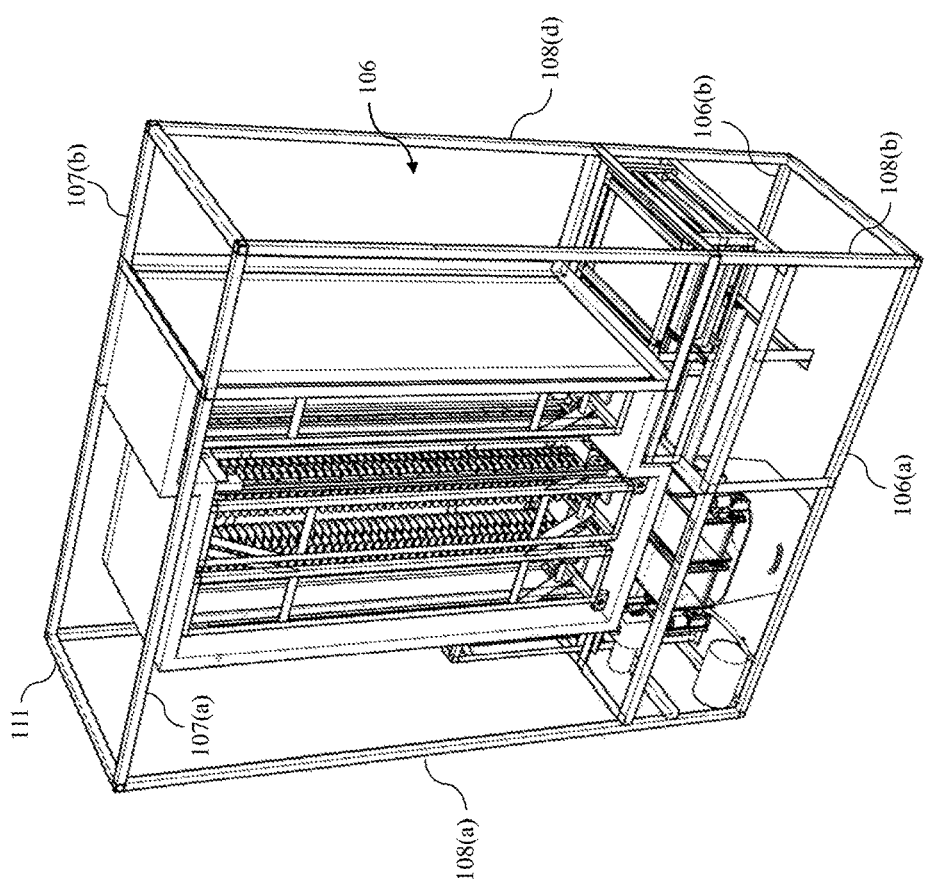
FIG. 5 is a top perspective front view of an apparatus for preparing a cooked food item, according to an example embodiment of the present invention.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

As used herein, the terms "in attachment with", "attached", "connected", "interconnected", "contacting", "coupled", "mounted," and the like encompasses both direct and indirect attachment between elements, unless stated otherwise.

The present invention improves upon the prior art by providing an apparatus for preparing cooked food that includes an automated cleaning system for the parts directly in contact with food, which minimize human intervention and, consequently, contamination risks. The apparatus includes at least one spray assembly having at least one nozzle configured to spray cleaning solution on a cooking area upward facing surface, a cooking area downward facing surface, and a plate. A movable wiper assembly defining an elongated body having a movable wiper cleaning surface along the elongated body is positioned proximate to the plate and configured to have the movable wiper cleaning surface move across the plate cooking surface when the plate is in a plate lower position. The apparatus further includes a fixed wiper defined by an elongated bar having at least one fixed wiper cleaning surface. The elongated bar is configured to engage the cooking area upward facing surface and the cooking area downward facing surface such that the fixed wiper cleans the cooking area upward facing surface and the cooking area downward facing surface when a spatula assembly moves between a spatula assembly cooking position and a spatula assembly non-cooking position.

Referring now to the Figures, FIGS. 1-6 illustrate an apparatus 100 for preparing a cooked food item according to an example embodiment of the present invention and will be discussed together for ease of reference. Although the examples given below describe the apparatus 100 as an apparatus for preparing and cooking a hamburger consisting of a ground beef patty, those of skill in the art will appreciate that the apparatus may be used to prepare and cook other foods having various shapes and sizes, including, but not limited to chicken, steak, pork, fish, bacon, pizza, tacos, vegetables, and eggs, and such variations are within the spirit and scope of the claimed invention.

The apparatus 100 includes a frame assembly 105 defining a housing 106 that is configured to hold or support a plurality of electrical and mechanical components of the apparatus 100. In one embodiment, the frame assembly includes a forward frame and a rearward frame. The forward frame includes a bottom frame 106(*a*), a top frame 107(*a*), and two side frames 108(*a*),108(*b*). The rearward frame includes a bottom frame 106(*b*), a top frame 107(*b*), and two side frames 108(*c*),108(*d*). The frame assembly 105 further includes a plurality of spanning cross members (111) interconnected between the forward frame and rearward frame. The forward frame, rearward frame, and plurality of spanning cross members (111) may be integrally formed to each other or may be comprised of different pieces which may be secured to each other by any suitable means, such as mechanical fastening means or welding. In one embodiment, the frame assembly 105 is made of a suitably strong metal, such as steel. However, it should be appreciated that the frame assembly 105 may be made of any suitable material or combination of materials and that the shape, configuration, and size of the frame assembly 105 may vary in accordance with the present invention. In certain embodiments the apparatus may be an enclosed vending machine configured to house all the components of the apparatus.

Figure 7:
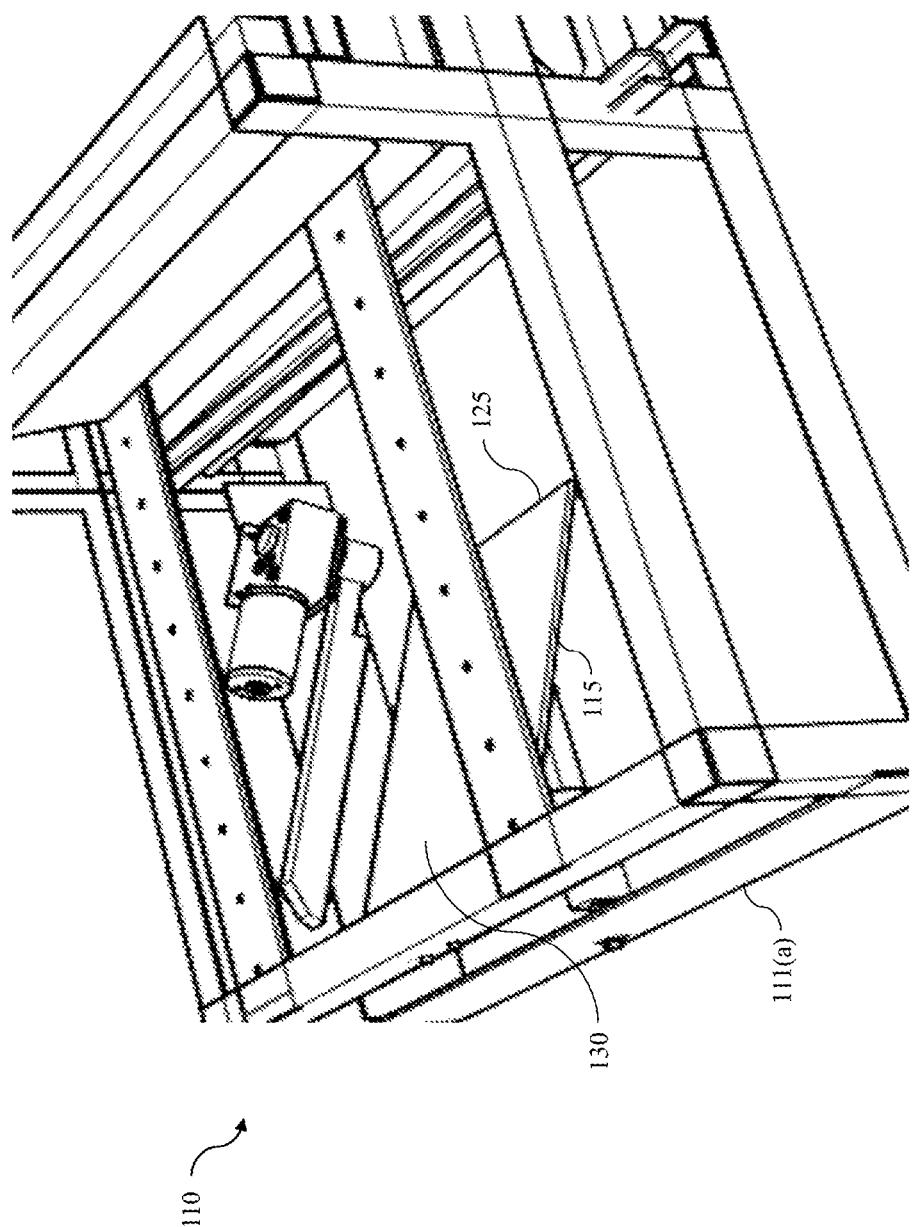
FIG. 7 is a top perspective view of a spatula assembly and a movable wiper assembly, according to an example embodiment of the present invention.
Figure 8:
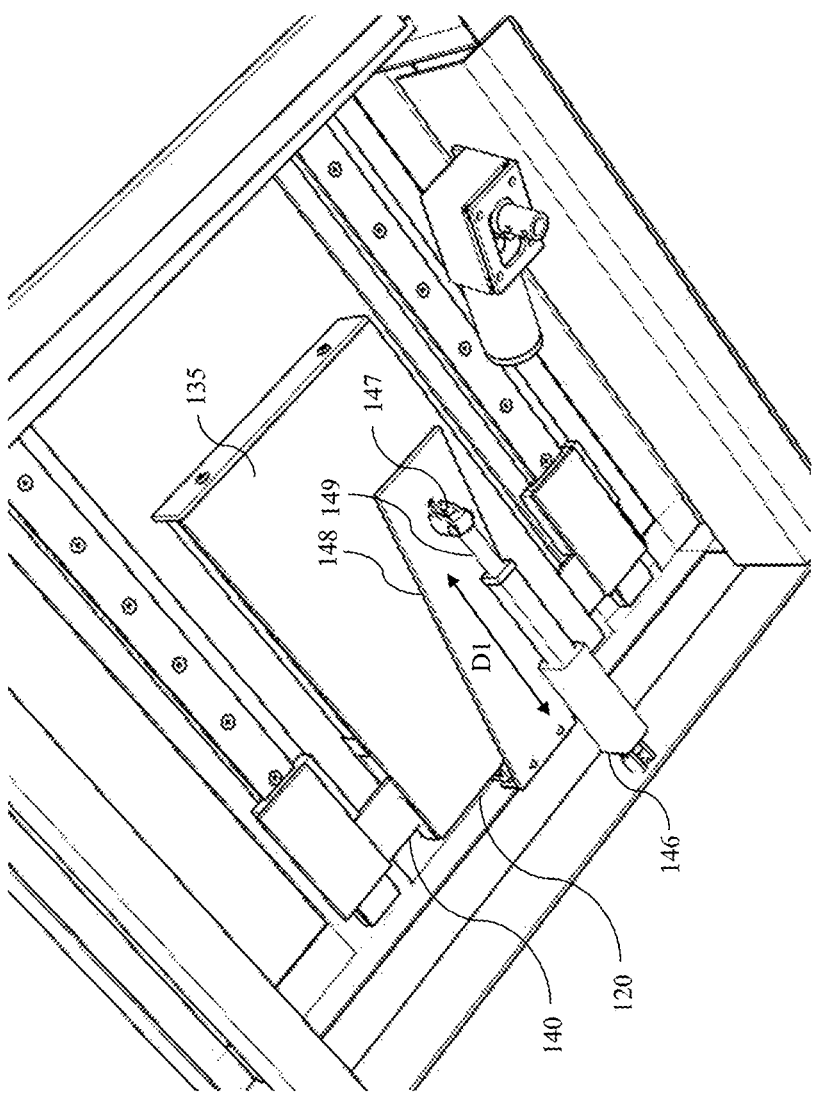
FIG. 8 is a bottom perspective view of a spatula assembly and a movable wiper assembly, according to an example embodiment of the present invention.

FIGS. 7 and 8 show a spatula assembly 110 according to an example embodiment of the present invention. The spatula assembly 110 defines a plate 115 that is configured to move between a plate upper position and a plate lower position, as further discussed below. The plate includes a plate first end portion 120 and a plate second end portion 125. The plate first end portion 120 is pivotally attached with a spatula assembly cross member 140 of the spatula assembly 110. The plate first end portion 120 may be attached to the spatula assembly cross member 140 with a shaft, hinge, pin, or any other suitable method known in the art. The plate 115 further includes a plate cooking surface 130 and a plate non-cooking surface 135. The plate cooking surface 130 is located on the upward facing side of the plate and the plate non-cooking surface 135 is located on the downward facing side of the plate. As further discussed below, the spatula assembly 110 is further configured to move between a spatula assembly cooking position and a spatula assembly non-cooking position.

In the present embodiment, the plate 115 has a square shaped body and a substantially planar surface. It should be appreciated that the plate 115 may have other shapes, dimensions, and surfaces, and such variations are within the spirit and scope of the claimed invention. For example, the plate 115 may have a circular shape body and a partially or entirely curved surface. The plate 115 may be comprised of materials such as stainless steel, aluminum, aluminum alloy, cast iron, steel, ceramic, or any other suitable material known in the art, and such variations are within the spirit and scope of the claimed invention. Additionally, the plate cooking surface 130 may be coated with one or more nonstick coatings, such as TEFLON® (i.e., fluorocarbon polymers) or (e.g., tetrafluoroethylene and fluorinated ethylene propylene) to ease the removal of a food item from the plate cooking surface 130 when the plate is in the plate lower position.

The spatula assembly 110 further includes a retaining member 200. The retaining member is configured to maintain a food item on the plate cooking surface 130. The retaining member 200 is in attachment with the spatula assembly cross member 140 above the plate 115. In the present embodiment, the retaining member 200 has a square shaped body with a circular opening 201 formed therethrough. The circular opening 201 is sized and shaped to accommodate a ground beef patty, however, it should be appreciated that the retaining member 200 may have other shapes, dimensions, and openings, and such variations are within the spirit and scope of the claimed invention. For example, the retaining member 200 may have a circular shape body and a square shaped opening formed therethrough. The retaining member 200 may be formed from the same material as the plate or may be formed from any other suitable material.

FIGS. 7 and 8 also show a telescoping arm assembly 145 according to an example embodiment of the present invention. The telescoping arm assembly 145 is movably engaged with the plate non-cooking surface 135. The telescoping arm assembly 145 is configured to move the plate 115 between the plate upper position and the plate lower position. The telescoping arm assembly 145 includes a first 146, a second end 147, and a plurality of telescoping segments 149 which telescope out to form an elongated arm moving the plate 115 between the plate upper position and the plate lower position. In one embodiment, the first end 146 of the telescoping arm assembly 145 is coupled to a horizontal cross member 111(*a*) spanning between the forward frame and the rearward frame of the apparatus 100, and the second end of the telescoping arm assembly 145 is directly attached to the plate non-cooking surface 135.

The telescoping arm assembly 145 is conductively and communicatively coupled to at least one controller and at least one power source and includes a linear actuator that is configured for extending and retracting (in the direction of double arrowed line D1) the telescoping arm assembly 145 via an electrically powered motor (not shown). In operation, to move the plate from the plate upper position to the plate lower position, the telescoping arm assembly 145 is retracted in the direction of arrowed line D2. Conversely, to move the plate from the plate lower position to the plate upper position, the telescoping arm assembly 145 is extended in the direction of arrowed line D3.

In the present embodiment, the first end 146 of the telescoping arm assembly 145 is coupled to the horizontal cross member 111(*a*) spanning between the forward frame and the rearward frame of the apparatus 100, and the second end of the telescoping arm assembly 145 is coupled to a pivot arm 148. The pivot arm 148 is configured to retain, or hold, the plate 115 in a desired position. For example, when the telescoping arm assembly 145 is extended, the pivot arm 148 is configured to hold the plate 115 in the plate upper position such that a food item component may be positioned upon the plate cooking surface 130. In another example, when the telescoping arm assembly 145 is retracted, the pivot arm 148 is configured to hold the plate 115 in the plate lower position such that the food item component may be delivered to at least one assembling area 235, as further discussed below.

Figure 9:
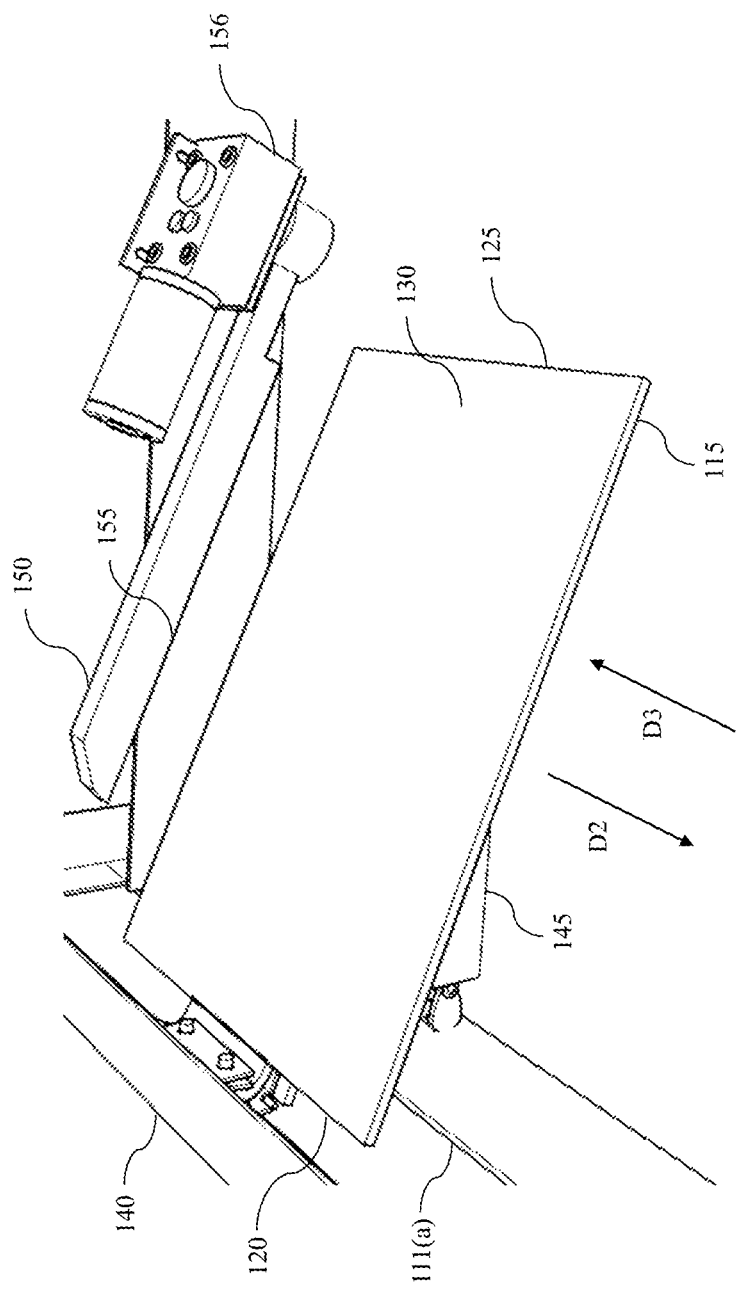
FIG. 9 is a perspective view of a spatula assembly and a movable wiper assembly, wherein the movable wiper assembly is in a first position, according to an example embodiment of the present invention.
Figure 10:
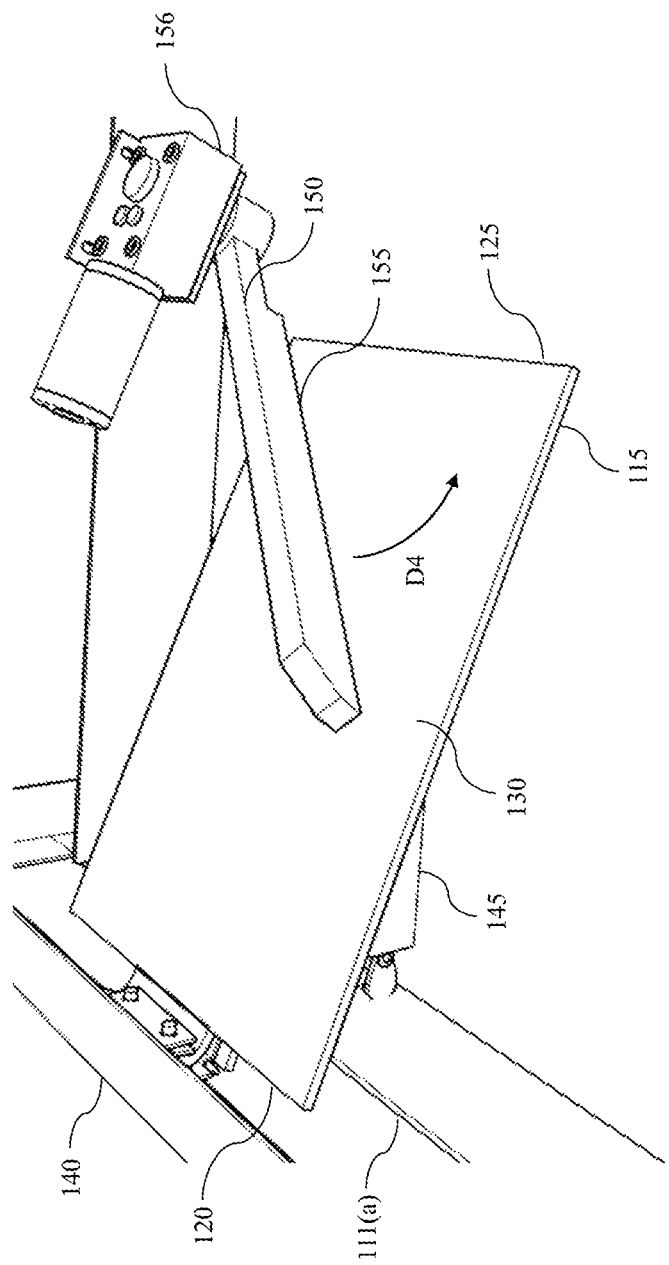
FIG. 10 is a perspective view of a spatula assembly and a movable wiper assembly, wherein the movable wiper assembly is in a second position, according to an example embodiment of the present invention.
Figure 11:
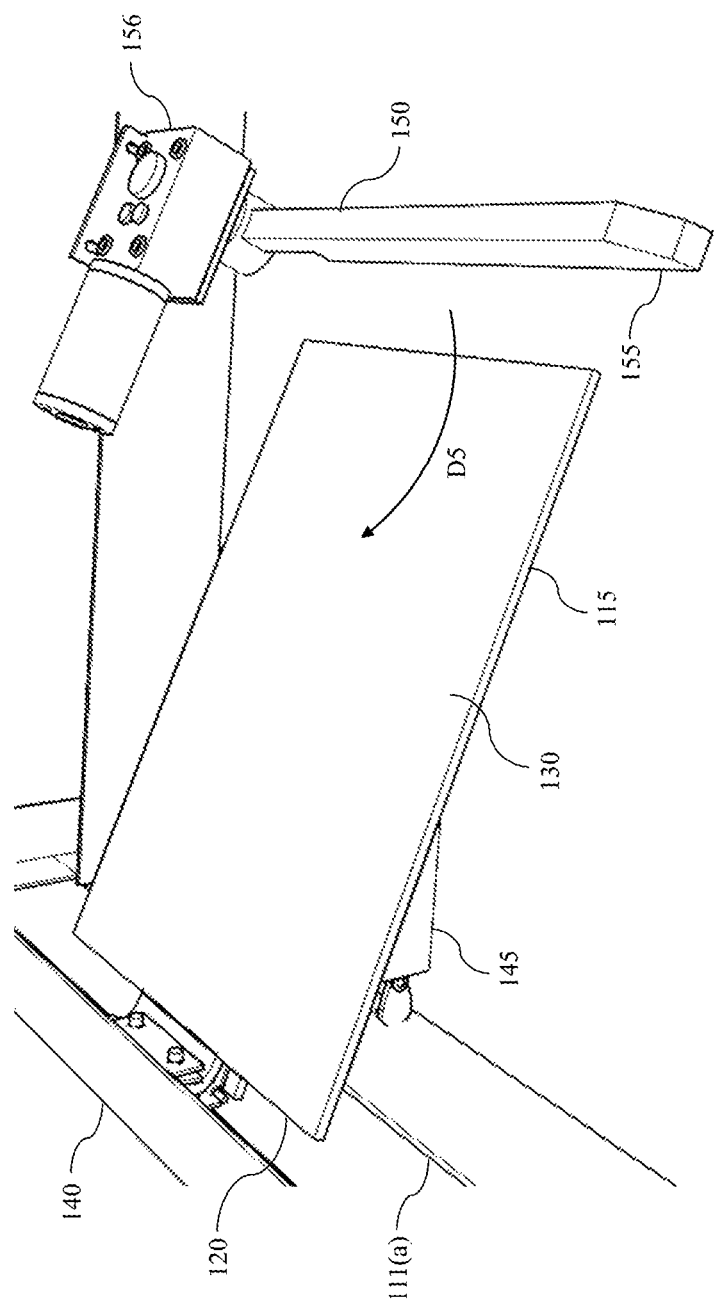
FIG. 11 is a perspective view of a spatula assembly and a movable wiper assembly, wherein the movable wiper assembly is in a third position, according to an example embodiment of the present invention.
Figure 12:
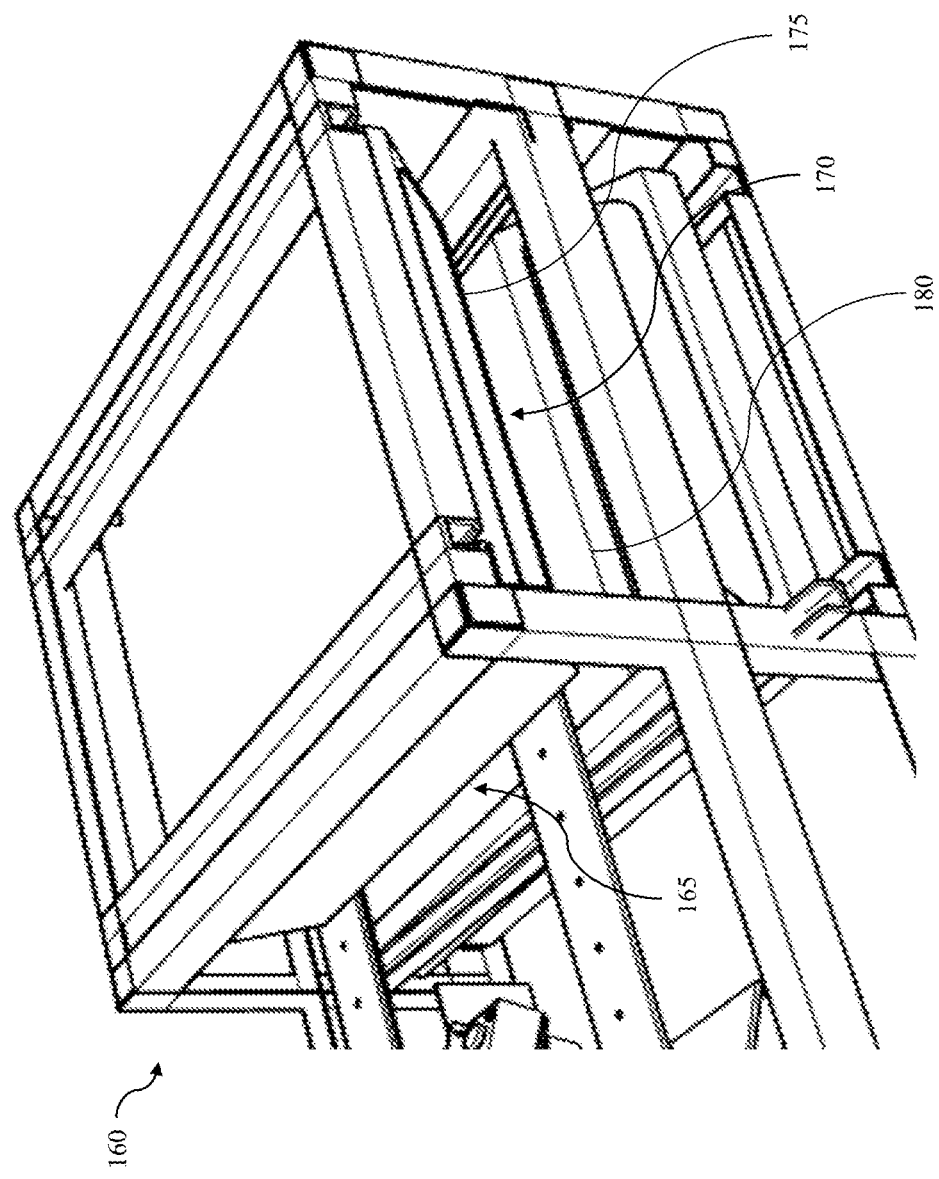
FIG. 12 is a top perspective front view of an oven assembly, according to an example embodiment of the present invention.
Figure 16:
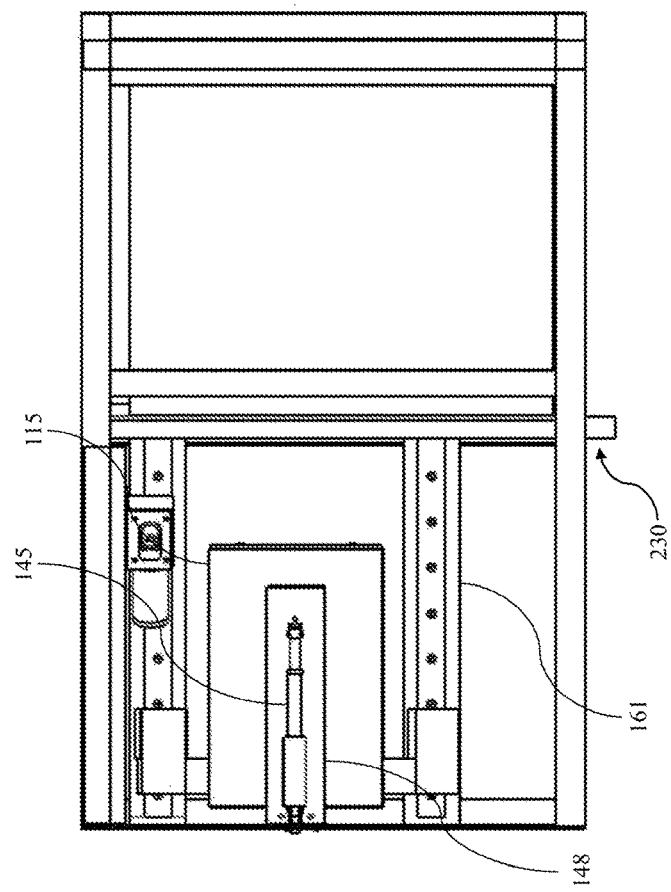
FIG. 16 is a bottom view of an oven assembly, according to an example embodiment of the present invention.
Figure 15:
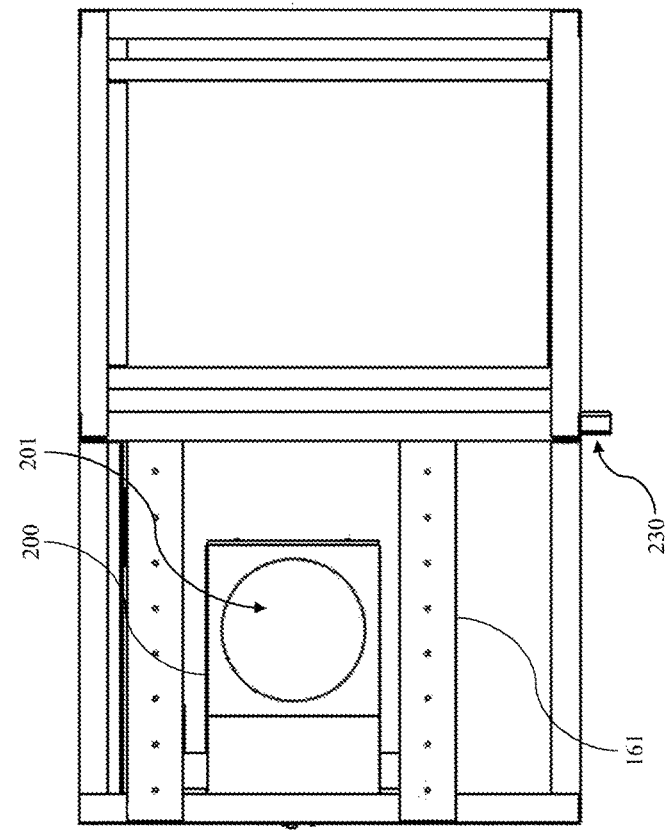
FIG. 15 is a top view of an oven assembly, according to an example embodiment of the present invention.

FIGS. 9-11 show a moveable wiper assembly 150 according to an example embodiment of the present invention. The moveable wiper assembly 150 is attached to a wiper shaft 157 and comprises an elongated body positioned proximate to the plate 115. The moveable wiper assembly 150 may be fastened to the wiper shaft 157 using nuts and bolts, rivets, or any other suitable fasteners. The elongated body includes a movable wiper cleaning surface 155 located along a downward facing side of the elongated body. The movable wiper assembly 150 is configured to move the movable wiper cleaning surface 155 located along the downward facing side of the elongated body across the plate cooking surface 130 when the plate 115 is in the plate lower position. The movable wiper assembly is conductively and communicatively coupled to the at least one controller, the at least one power source, and an electric motor (not shown). The electric motor (not shown) is connected to the wiper shaft 157 so as to cause rotation of the wiper shaft in a first direction and a second direction.

In operation, as shown in FIG. 9, the moveable wiper assembly 150 is brought into contact with the plate 115 such that the movable wiper cleaning surface 155 is pressed against the plate cooking surface 130. As the movable wiper cleaning surface 155 oscillates from the first direction (in the direction of arrowed line D4) to the second direction (in the direction of arrowed line D5) as shown in FIGS. 10 and 11, respectively, the movable wiper cleaning surface 155 removes debris (e.g., food particles, grease, cleaning solution) from the plate cooking surface 130. In the present embodiment, the moveable wiper assembly 150 has an elongated rectangular shaped body and a substantially planar wiper cleaning surface. It should be appreciated that the moveable wiper assembly 150 may have other shapes, dimensions, and wiper cleaning surfaces and such variations are within the spirit and scope of the claimed invention. For example, the moveable wiper assembly 150 may have an elongated cylindrical shaped body and a partially or entirely curved wiper cleaning surface.

FIGS. 12-16 show at least one oven assembly 160 according to an example embodiment of the present invention. The at least one oven assembly 160 includes an open first end 165 for providing access to a cooking area 170. The cooking area 170 includes a cooking area downward facing surface 175 and a cooking area upward facing surface 180. The cooking area downward facing surface 175 and the cooking area upward facing surface 180 include dual coils such that food items may be inductively heated from both the cooking area downward facing surface 175 and the cooking area upward facing surface 180. The at least one oven assembly 160 is conductively and communicatively coupled to the at least one controller and the at least one power source. The at least one controller is configured to send a plurality of signals to cause the spatula assembly 110 to move between the spatula assembly cooking position and the spatula assembly non-cooking position.

Figure 17:
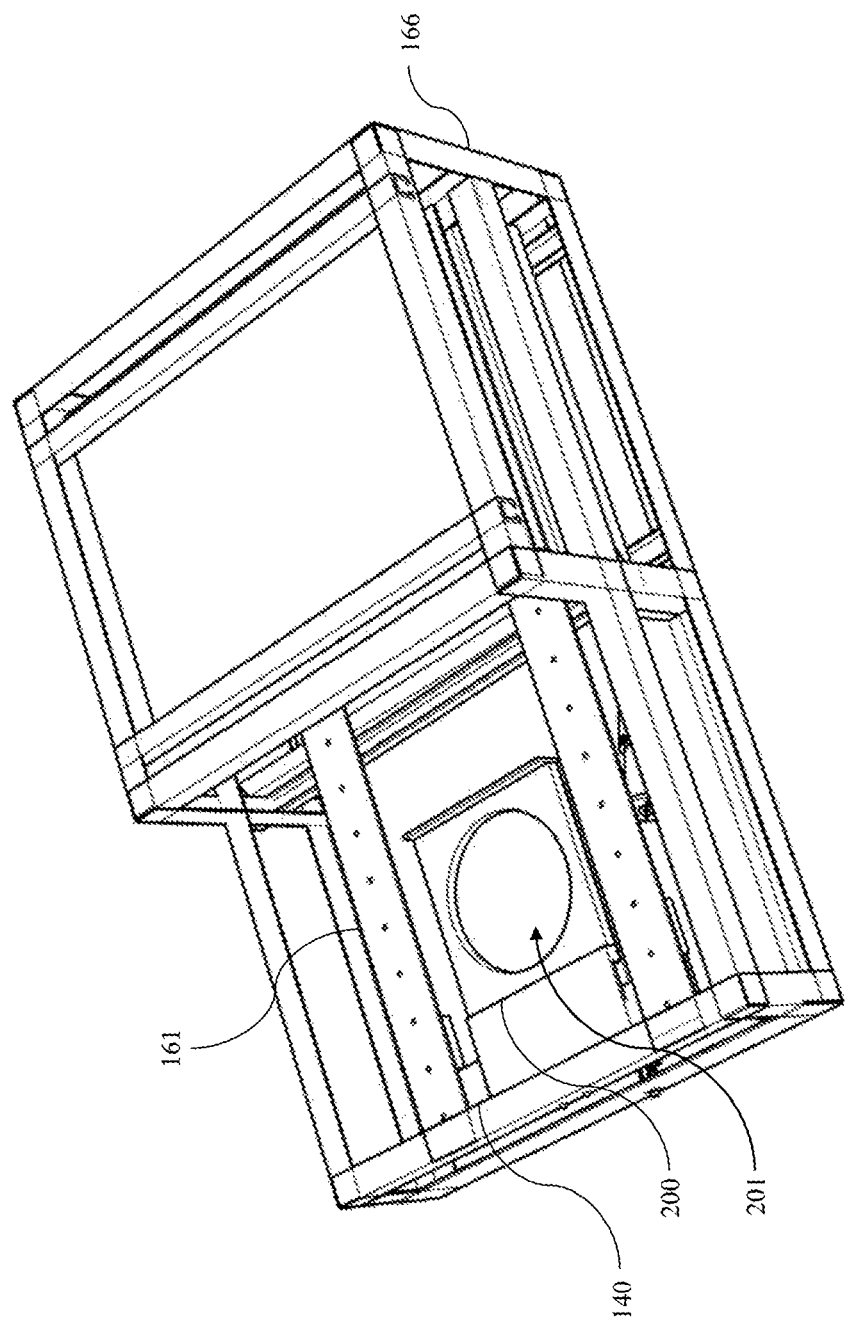
FIG. 17 is a top perspective front view of an oven assembly and a retaining member, according to an example embodiment of the present invention.
Figure 18:
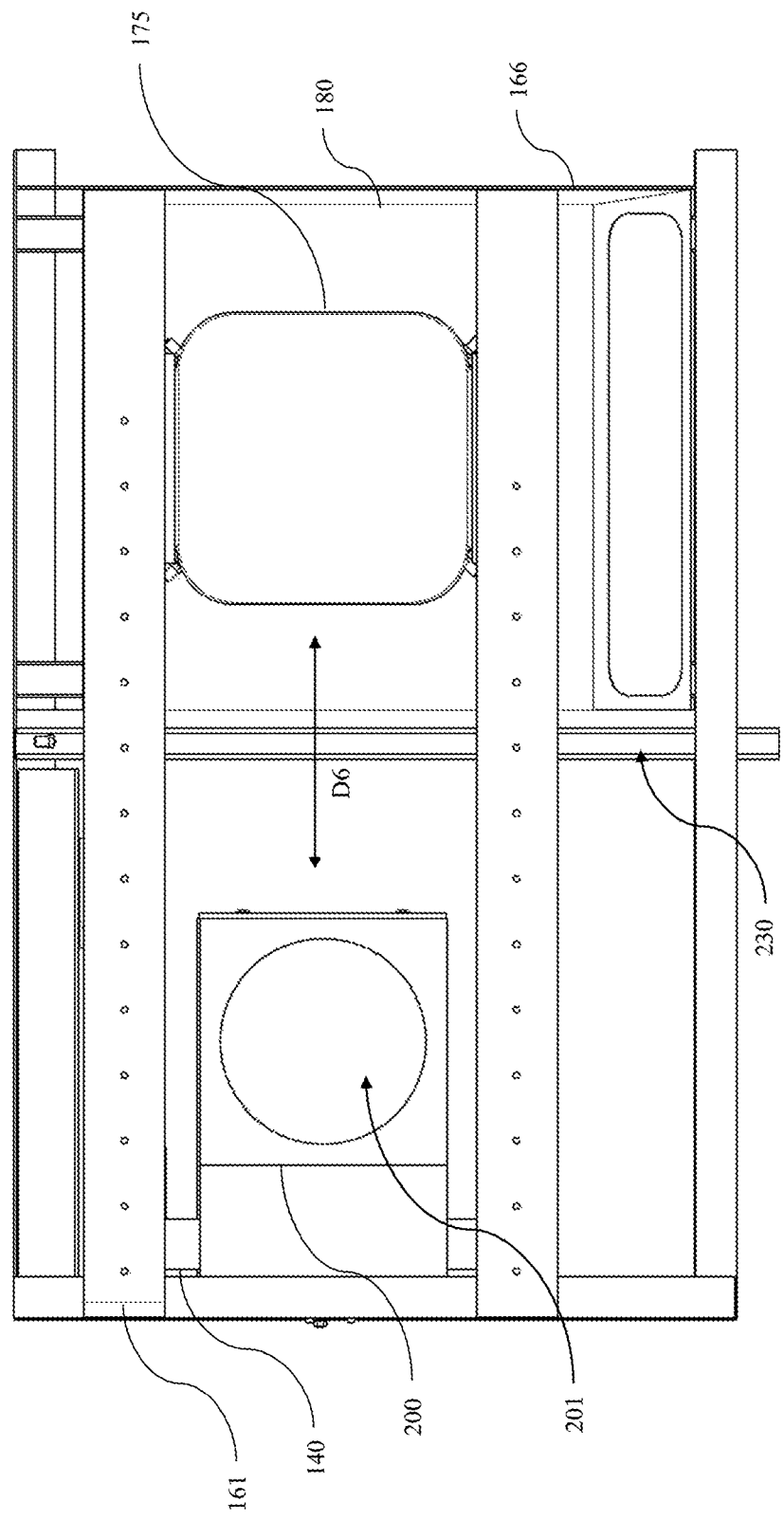
FIG. 18 is a cross-sectional top view of an oven assembly, according to an example embodiment of the present invention.
Figure 19:
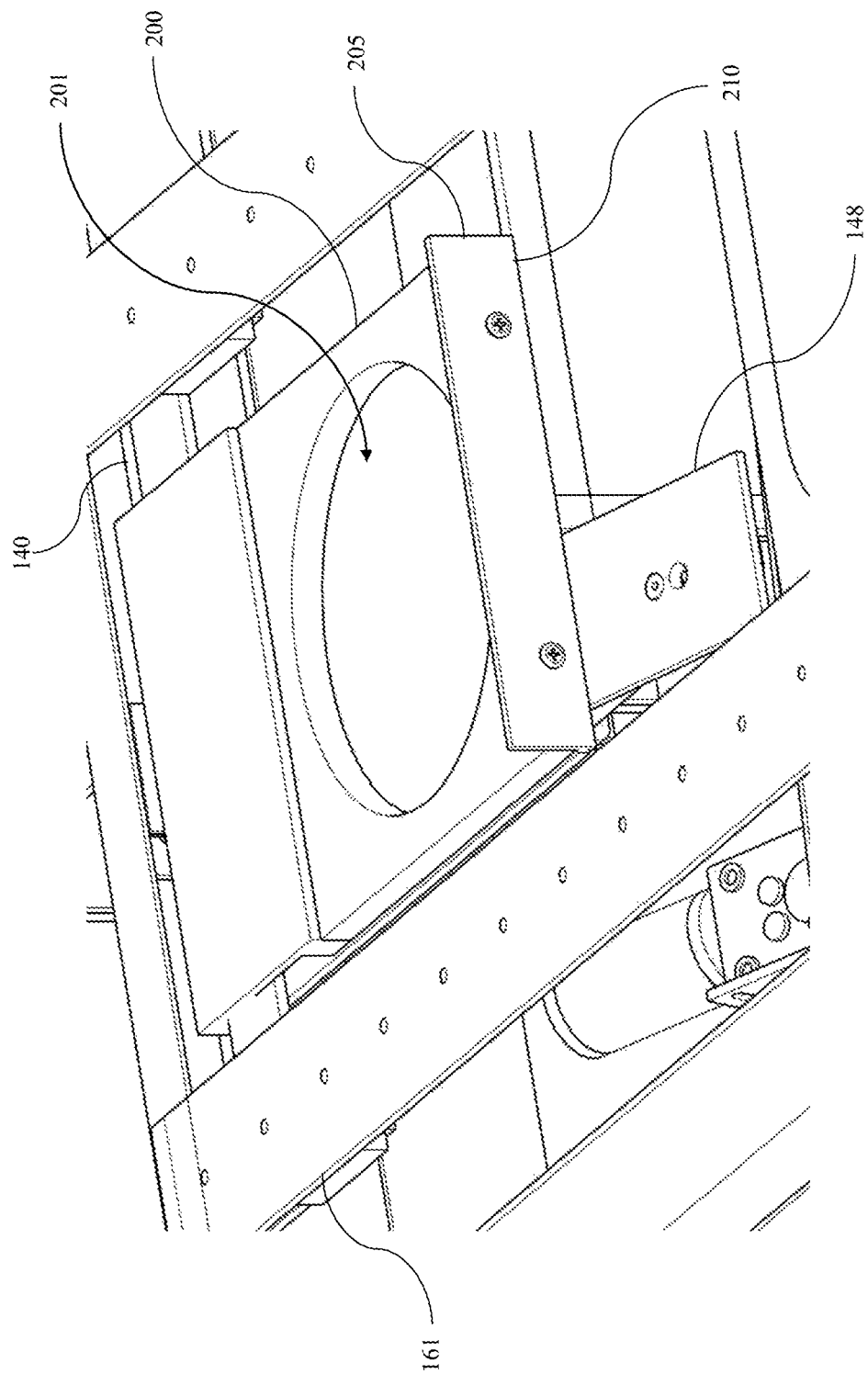
FIG. 19 is a top perspective side view of a spatula assembly, wherein the spatula assembly is in a spatula assembly non-cooking position; according to an example embodiment of the present invention.
Figure 20:
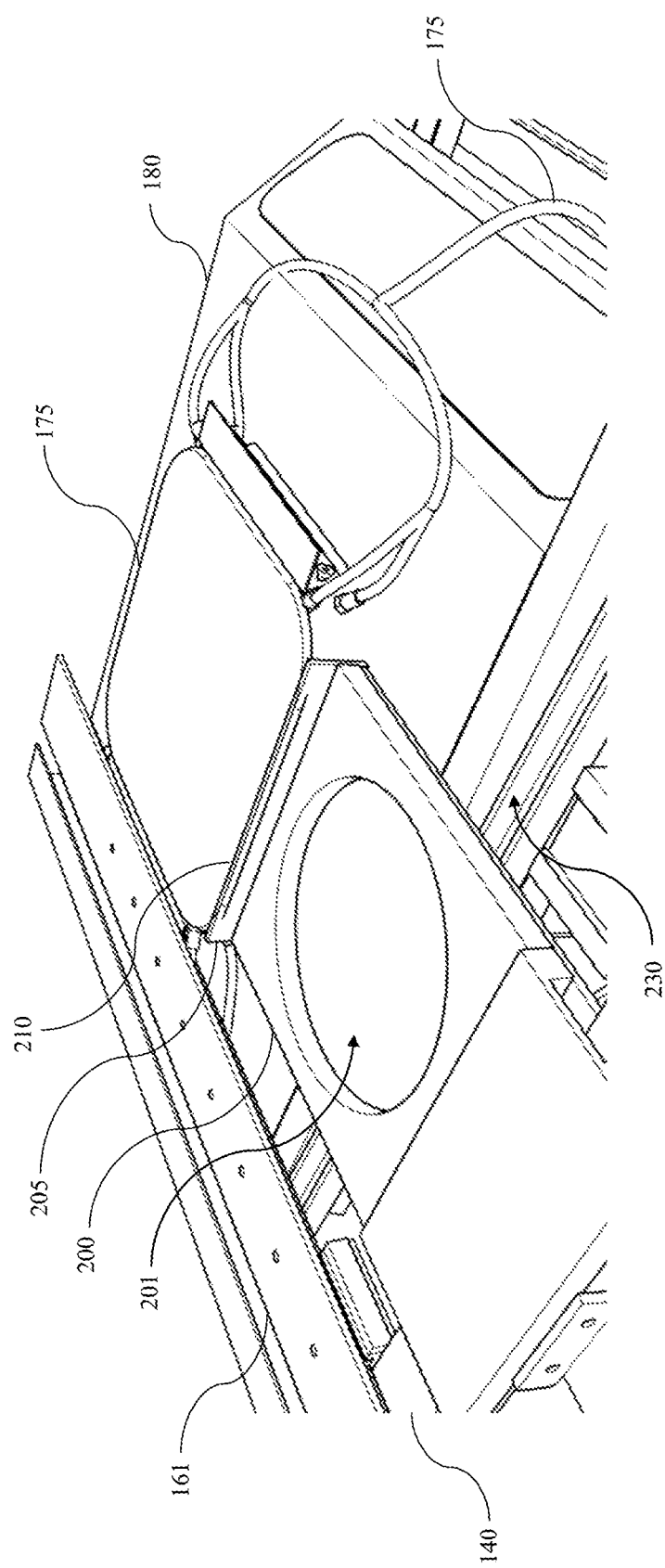
FIG. 20 is cross-sectional top view of an oven assembly, wherein a spatula assembly is in between a spatula assembly cooking position and a spatula assembly non-cooking position, according to an example embodiment of the present invention.
Figure 21:
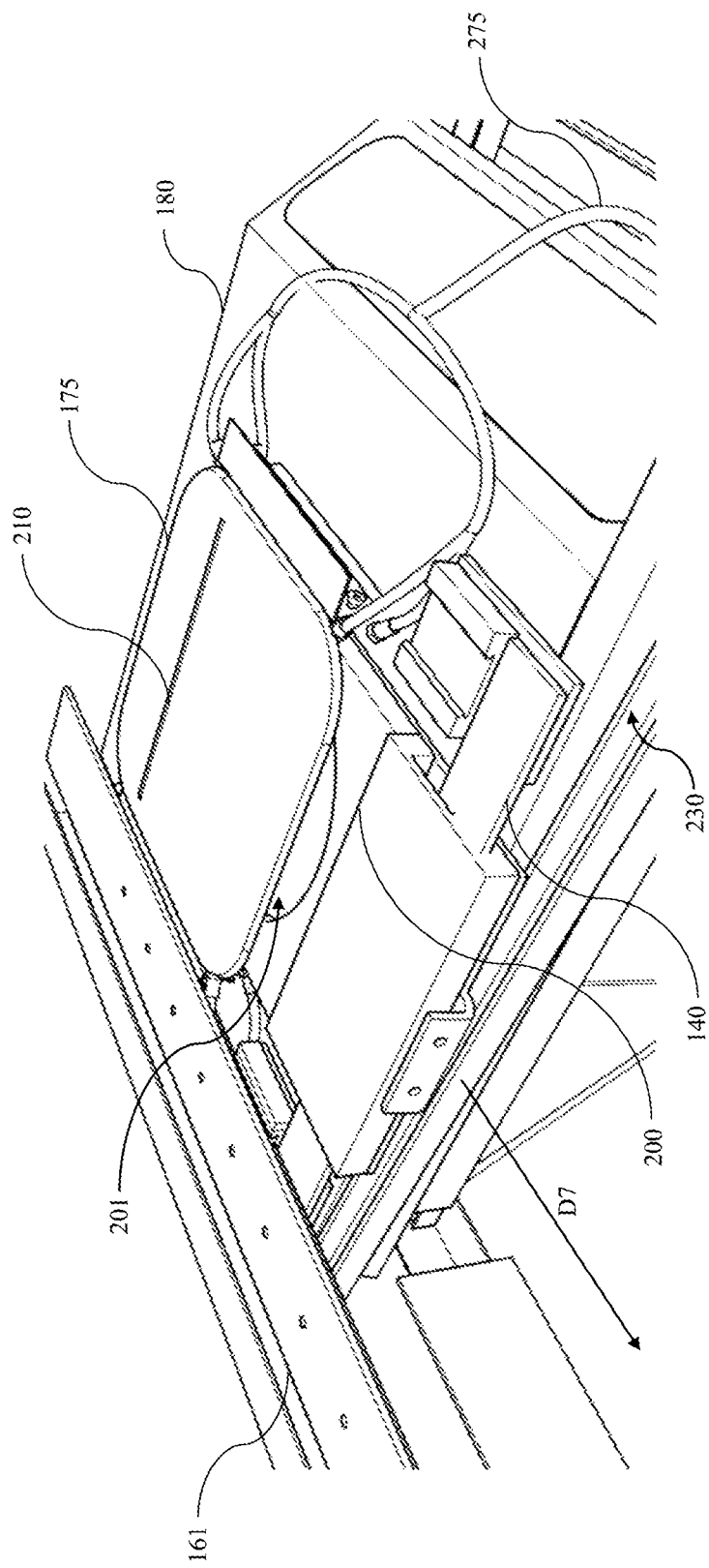
FIG. 21 is a cross-sectional top view of an oven assembly, wherein a spatula assembly is in a spatula assembly cooking position, according to an example embodiment of the present invention.

As best illustrated in FIGS. 17 and 18, the at least one oven assembly 160 includes a track 161 to allow the spatula assembly 110 to move between the spatula assembly cooking position and the spatula assembly non-cooking position (in the direction of doubled arrowed line D6). In the spatula assembly non-cooking position, as shown in FIGS. 19 and 20, substantially all of the plate 115 is positioned outside of the cooking area 170. In the spatula assembly cooking position, as shown in FIG. 21, substantially all of the plate 115 is positioned inside the cooking area of the oven assembly. As used herein, "substantially all" is meant to define at least about 95% of the plate 115, and most preferably at least about 99% of the plate 115. It should be appreciated that the at least one oven assembly 160 may be adapted for roasting, baking, frying, steaming, or heating applications, and such variations are within the spirit and scope of the claimed invention.

FIG. 19 further shows a fixed wiper 205 in attachment with the spatula assembly cross member 140 according to an example embodiment of the present invention. The fixed wiper 205 is attached to an end of the retaining member 200 and is defined by an elongated bar. The fixed wiper 205 may be fastened to the end of the retaining member 200 using nuts and bolts, rivets, or any other suitable fasteners. The fixed wiper 205 includes at least one fixed wiper cleaning surface 210 located along an upward facing side of the elongated bar and a downward facing side of the elongated body. The fixed wiper 205 is configured to engage at least one of the cooking area upward facing surface 180 and the cooking area downward facing surface 170 such that the fixed wiper 205 cleans at least one of the cooking area upward facing surface 180 and cooking area downward facing surface 170 when the spatula assembly 110 moves between the spatula assembly cooking position and the spatula assembly non-cooking position. The at least one oven assembly 160 includes a waste channel 230 located below the cooking area upward facing surface 180. The waste channel 230 is configured to collect the debris (e.g., food particles, grease, cleaning solution) that the fixed wiper 205 removes from the cooking area upward facing surface 180 and cooking area downward facing surface 170.

In operation, as illustrated in FIG. 21, when the spatula assembly 110 is in the spatula assembly cooking position, the at least one fixed wiper cleaning surface 210 located along the upward facing side and downward facing side of the elongated bar is pressed against the cooking area upward facing surface 180 and cooking area downward facing surface 170. As the fixed wiper 205 moves from the spatula assembly cooking position to the spatula assembly non-cooking position (in the direction of arrowed line D7), the at least one fixed wiper cleaning surface 210 removes and cleans debris from the cooking area upward facing surface 180 and cooking area downward facing surface 170. In the present embodiment, the fixed wiper 205 has an elongated rectangular shaped body and a substantially wiper cleaning surface 210. It should be appreciated that the fixed wiper 205 may have other shapes, dimensions, and wiper cleaning surfaces 210 and such variations are within the spirit and scope of the claimed invention. For example, the wiper cleaning surface 210 may be jagged, curved, or angled, and such variations are within the spirit and scope of the claimed invention.

Figure 22:
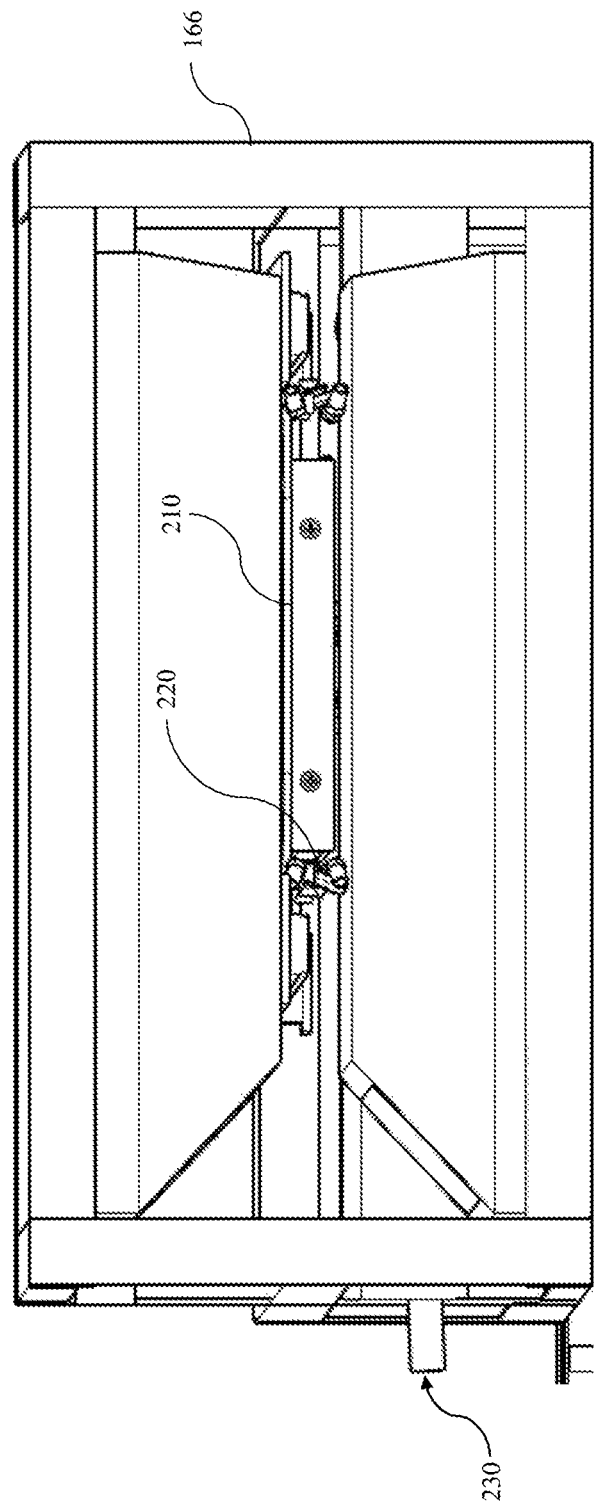
FIG. 22 is a left side view of an oven assembly, wherein a spatula assembly is in a spatula assembly cooking position, according to an example embodiment of the present invention.
Figure 23:
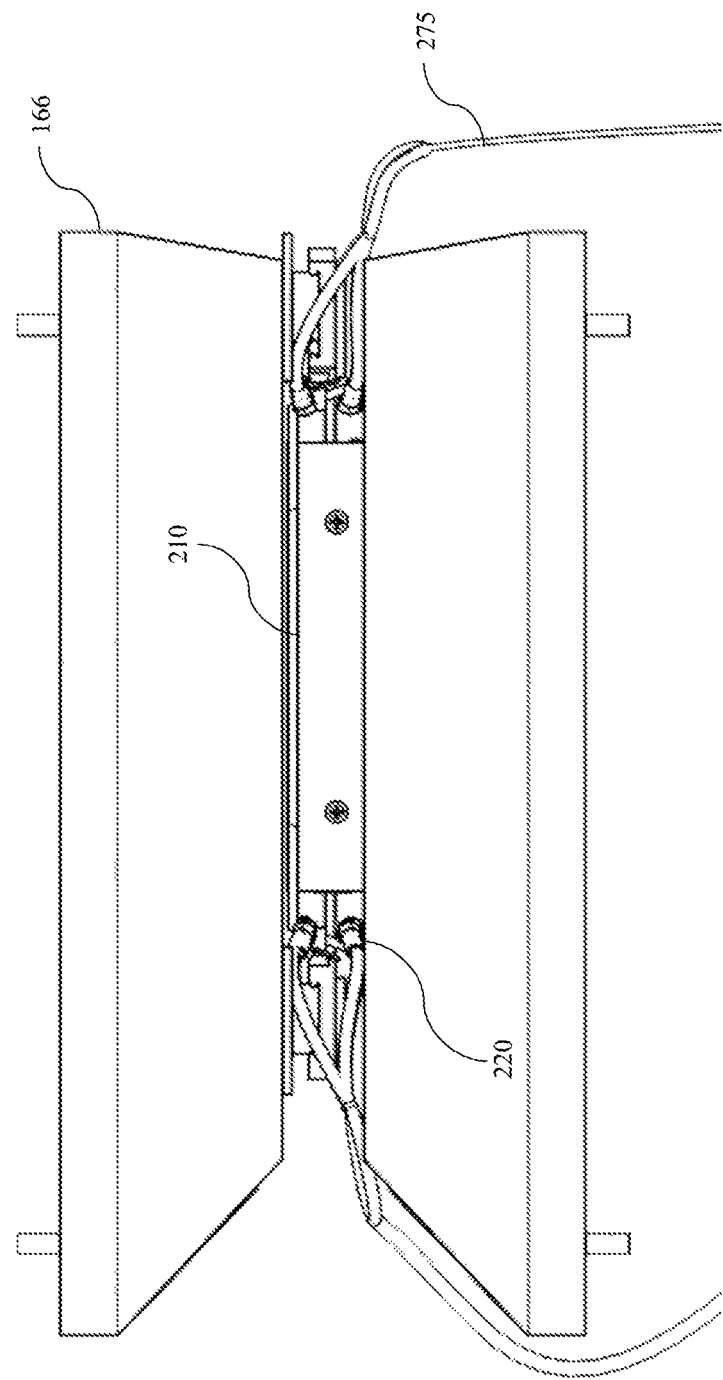
FIG. 23 is a left side view of an oven assembly and a spray assembly, wherein a spatula assembly is in a spatula assembly cooking position, according to an example embodiment of the present invention.

FIGS. 22 and 23 show at least one spray assembly 215 attached to an oven assembly second end 166 according to an example embodiment of the present invention. The at least one spray assembly 215 includes at least one nozzle 220 that is configured to spray cleaning solution onto at least one of the: cooking area upward facing surface 180, cooking area downward facing surface 170, and plate 115. In one embodiment, a pump (not shown) is fluidly connected to a cleaning solution container (not shown) and to a flexible tube 225. The flexible tube 225 fluidly connects the cleaning solution container to the at least one nozzle 220. In operation, when the spatula assembly is in the spatula non-cooking position as best shown in FIG. 17, the pump moves the cleaning solution stored in the cleaning solution container through the at least one flexible tube 225 and to the at least one nozzle 220 such that the cooking area upward facing surface 180, cooking area downward facing surface 170, and plate 115 are sprayed with cleaning solution.

The apparatus 100 includes at least one controller (not shown) is configured for controlling the electrical and mechanical components of the apparatus. The at least one controller is conductively and communicatively coupled, via a communication bus, to allow communication and conductive coupling to the at least one power source, the mechanical components of the apparatus (e.g., spatula assembly, oven, telescoping arm assembly, moveable wiper assembly, etc.), and a plurality of sensors (not shown) located throughout the apparatus. The least one controller is further configured to receive and monitor sensor data from the plurality of sensors (not shown). The plurality of sensors may include temperature sensors, positional sensors, optical sensors, tilt sensors, infrared sensors, or the like to determine the status of, or monitor the status of, various aspects of the apparatus. For example, the apparatus may include a sensor to measure the temperature in the oven assembly cooking area, a sensor to detect the stock level of a food item component or food receptacle 261, a sensor to detect the amount of cleaning solution in the cleaning solution container, and a sensor to detect the fill level of the disposal area.

Figure 30:
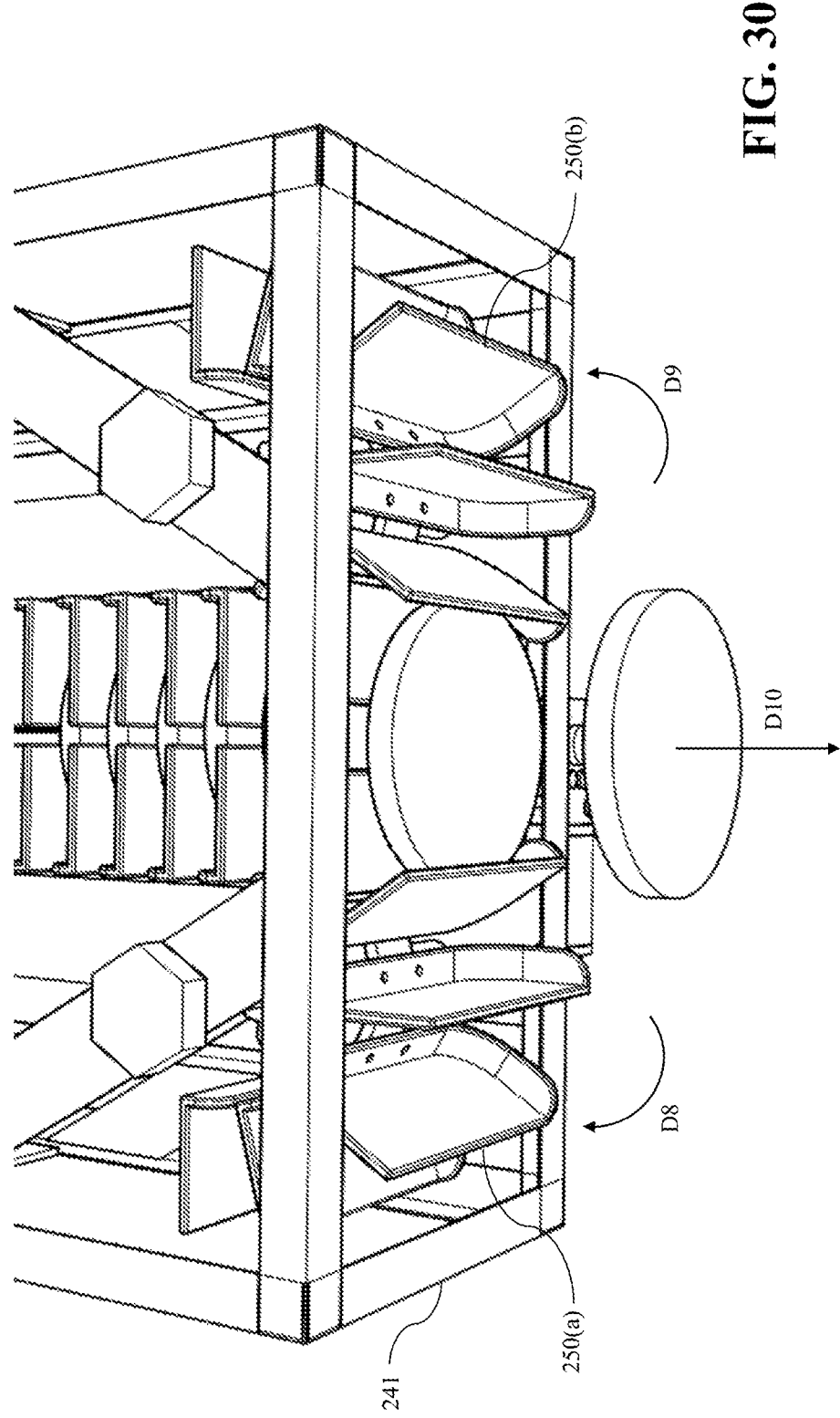
FIG. 30 is a bottom perspective left side view of a vertically stacked movable platform, according to an example embodiment of the present invention.

FIGS. 24-30 show at least one assembling area 235 and a conveyor system 240 according to an example embodiment of the present invention. The conveyor system 240 is located above each assembling area 235 for storing and delivering a food item component to at least one assembling area 235. The conveyor system is secured to the frame element 105 with bolts, however, other attachment devices may be used, including screws, bolts, welds, pins, clamps, or any other suitable method known in the art. The conveyor system 240 includes a plurality of vertically stacked movable platforms 245(a), 245(b), 245(c). As best illustrated in FIG. 30, each movable platform is formed by a pair of movable doors 250(a), 250(b) configured to have at least one of said doors move open. In operation, the pair of movable doors 250(a), 250(b) move in the direction of arrowed lines D8 and D9, respectively, at a conveyer system bottom end portion 241 such that the food item component moves into the assembling area 235 (in the direction of arrowed line D10) below the conveyer system 240.

In the present embodiment, the vertically stacked movable platforms include a bottom portion of a hamburger bun 257, a top portion of a hamburger bun, and a ground beef patty 259. It should be appreciated that the conveyor system may include additional vertically stacked movable platforms of various shapes and dimensions for storing and delivering additional food item components. The conveyor system 240 may also include a plurality of containers (not shown) above each assembling area 235 for storing and delivering toppings and condiments, such as cheese, lettuce, tomatoes, onions, ketchup, mustard, and mayonnaise, to one of the assembling areas 235, and such variations are within the spirit and scope of the claimed invention.

In one embodiment, the apparatus includes a thermal control system (not shown) for maintaining the food item components, toppings, and condiments at hot, cold, and ambient or room temperature. The thermal control system may comprise a cooling apparatus, a heating apparatus, an ambient temperature apparatus, ducting or piping, valves, and insulated walls such that each vertically stacked movable platform and container may have a different temperature setting.

Figure 31:
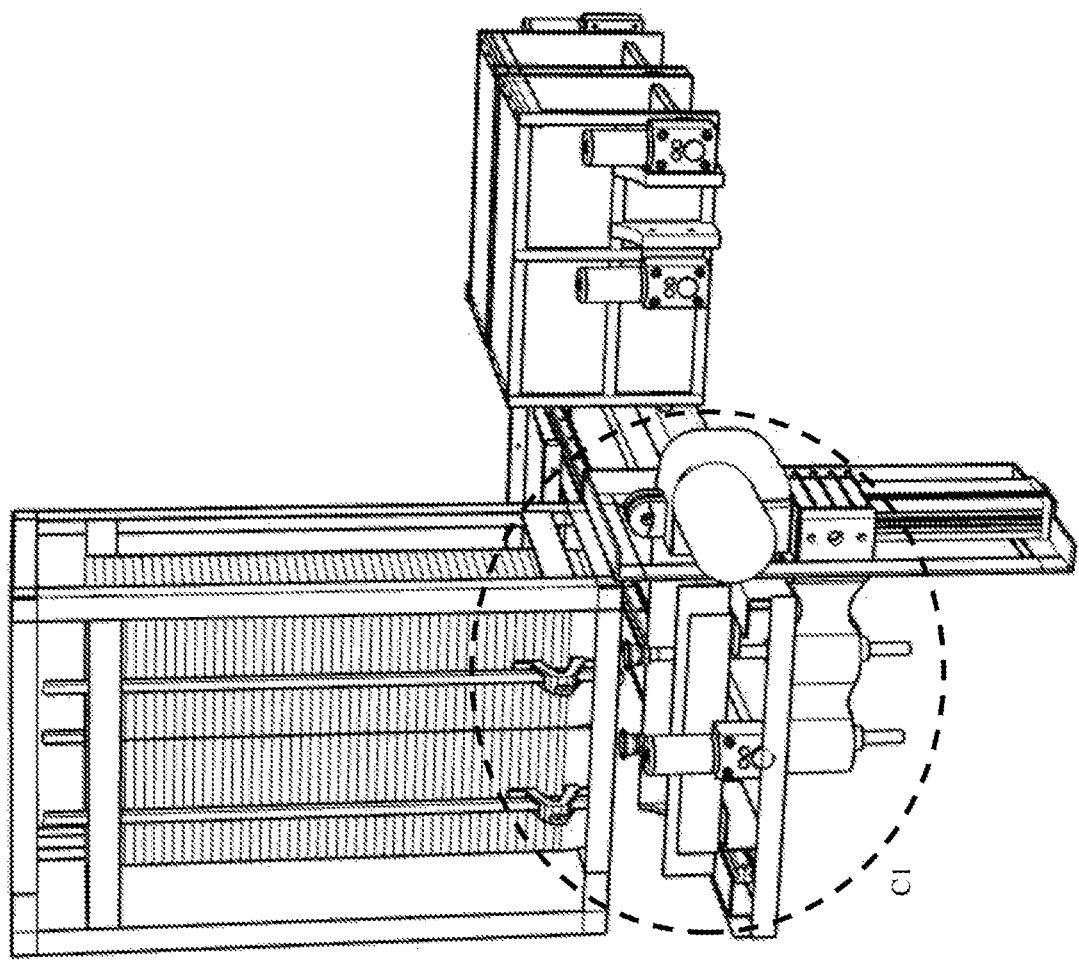
FIG. 31 is a perspective right side view of a vertical compartment and a vacuum system, according to an example embodiment of the present invention.
Figure 32:
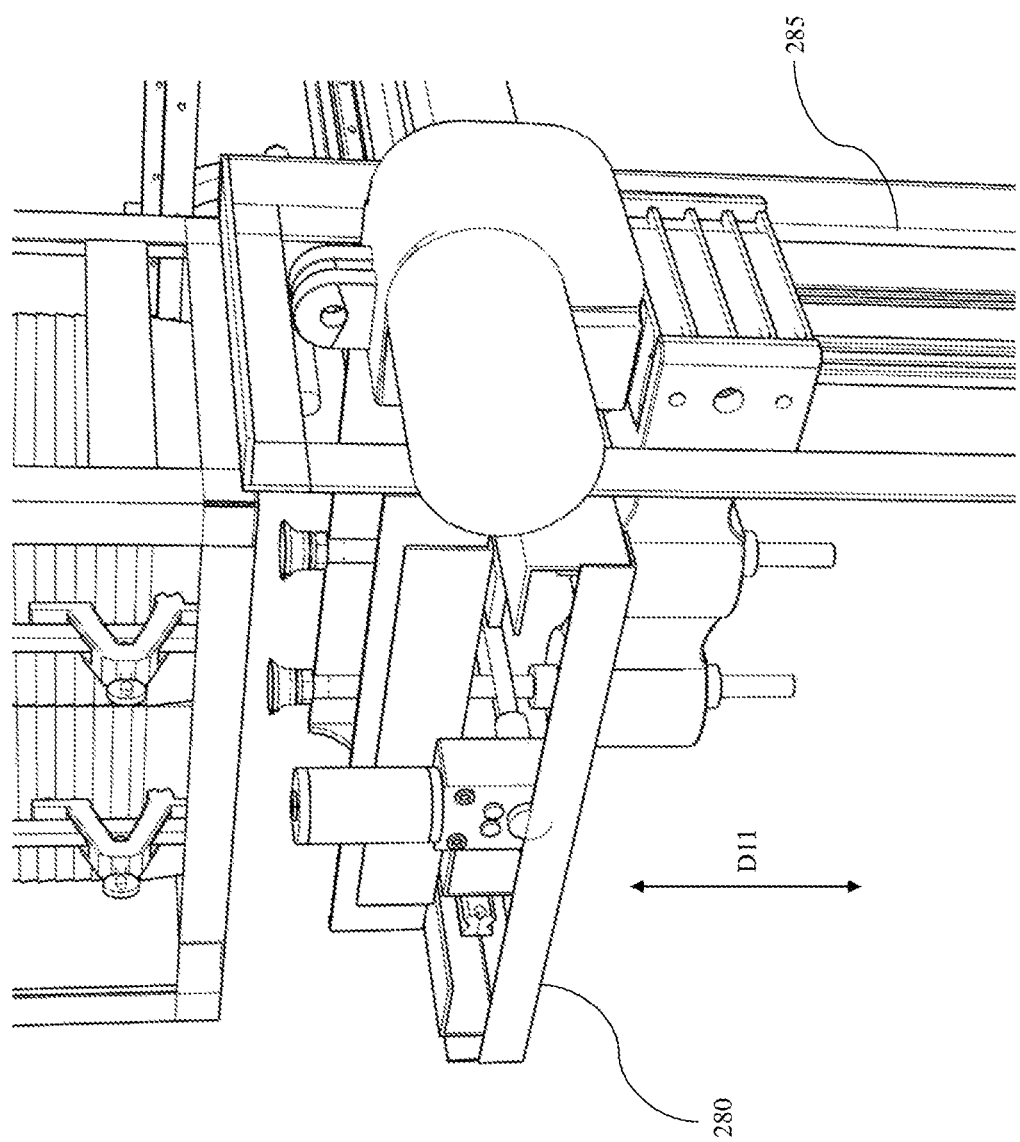
FIG. 32 is a magnified perspective view of a portion of the area enclosed within circle C1 of FIG. 31, according to an example embodiment of the present invention.

FIGS. 31 and 32 show a vertical compartment 260 for storing and delivering a food receptacle 261 to one of the assembling areas 235 according to an example embodiment of the present invention. The food receptacle 261 is configured to store a fully assembled cooked food item. The food receptacle 261 is positioned in a top-down orientation, leaving a bottom surface of the food receptacle 261 accessible to a vacuum system located below the assembling area 235. The vacuum system includes at least one vacuum suction head 270, at least one vacuum hose (not shown), and a pump (not shown). The at least one vacuum suction head 270 is affixed to a horizontal support arm 280 having a gear wheel (not shown) attached on a vertical track 285. A motor (not shown) coupled to the gear wheel rotates the gear wheel to effectuate movement (in the direction of double arrowed line D11) of the at least one vacuum suction head 270.

In operation, the gear wheel is rotated in a first direction to raise the horizontal support arm 280 such that the at least one vacuum suction head 270 is aligned with the bottom surface of the food receptacle 261. When the at least one vacuum suction head 270 reaches a position of close proximity to the food receptacle 261, the at least one vacuum suction head 270 adheres to the bottom surface of the food receptacle 261. Upon the food receptacle 261 adhering to the at least one vacuum suction head 270, the gear wheel is rotated in a second direction such that the food receptacle 261 is removed from its nested position in the vertical compartment 260 and lowered to the assembling area 235.

In one embodiment, the food receptacle 261 is a clamshell box that is sized and shaped to store a fully assembled hamburger. The clamshell box is preferably comprised from an integral piece of recyclable, non-toxic and food safe paper-based material such as corrugated cardboard or may be similarly comprised of biodegradable or compostable materials such as sugarcane, bamboo, and plant-based materials. It should be appreciated that the food receptacle 261 may comprise various shapes, dimensions, and configurations to accommodate other fully assembled cooked food items. For example, plates, bowls, or food-based receptacles such as tortillas, or any other type of food receptacles may be used in place of a clamshell box, and such variations are within the spirit and scope of the claimed invention.

Figure 33:
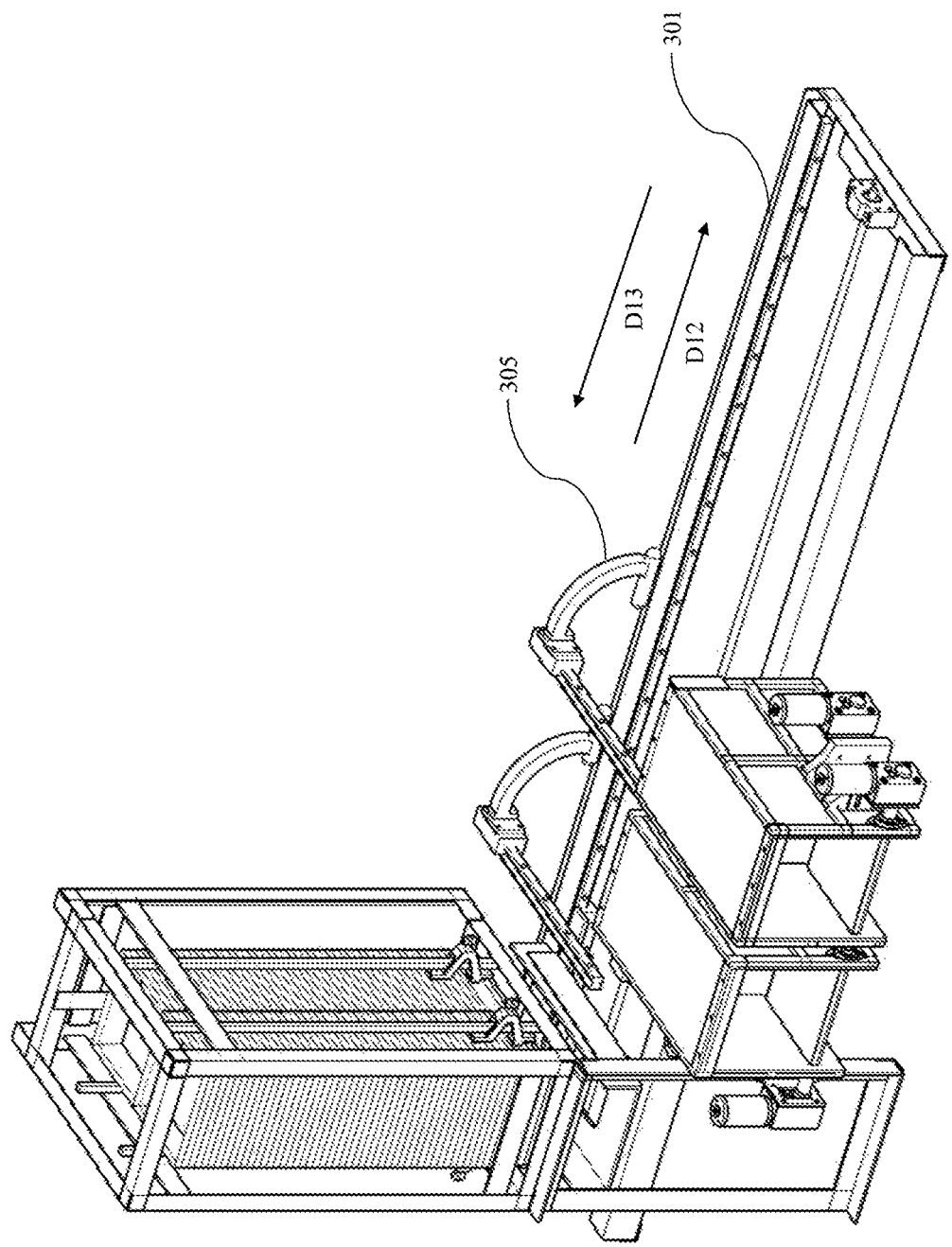
FIG. 33 is a top perspective front view of a movable carrier and at least one movable arm mounted on a track, according to an example embodiment of the present invention.
Figure 34:
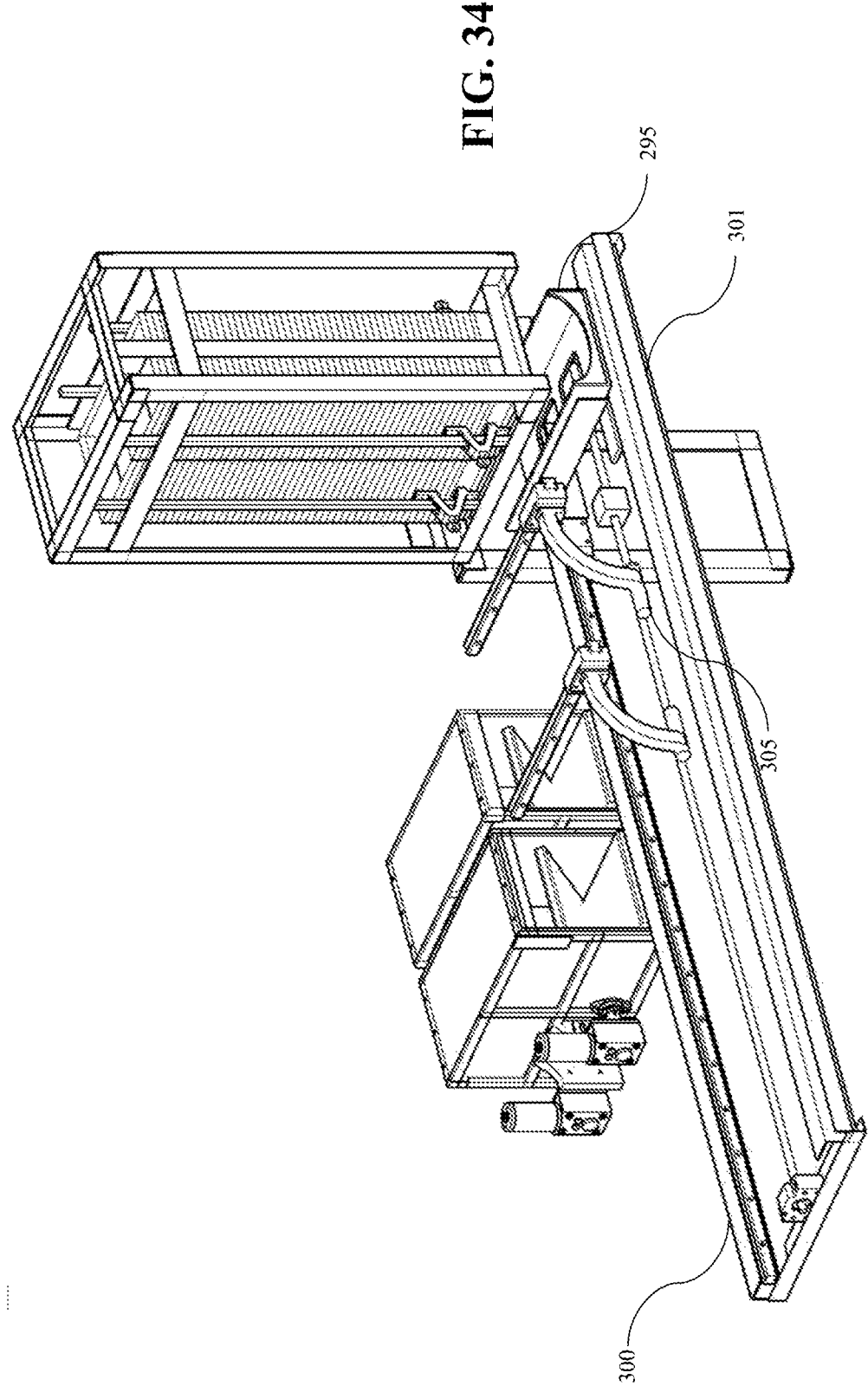
FIG. 34 is a top perspective rear view of a movable carrier and at least one movable arm mounted on a track, according to an example embodiment of the present invention.
Figure 44:
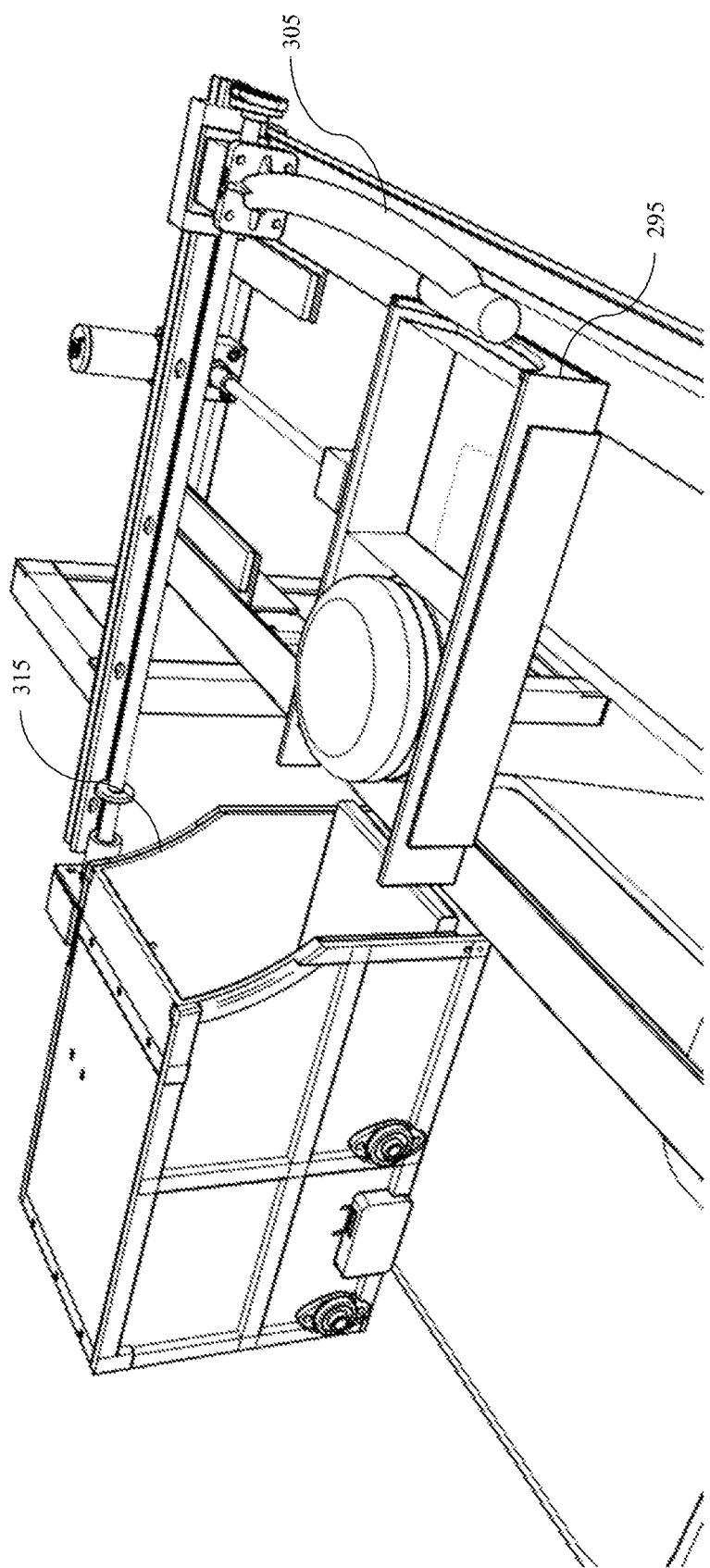
FIG. 44 is a perspective side view of a food receptacle containing a fully assembled cooked food item proximate to a pickup area first element, wherein a movable arm is positioned rearward of a track, according to an example embodiment of the present invention.
Figure 45:
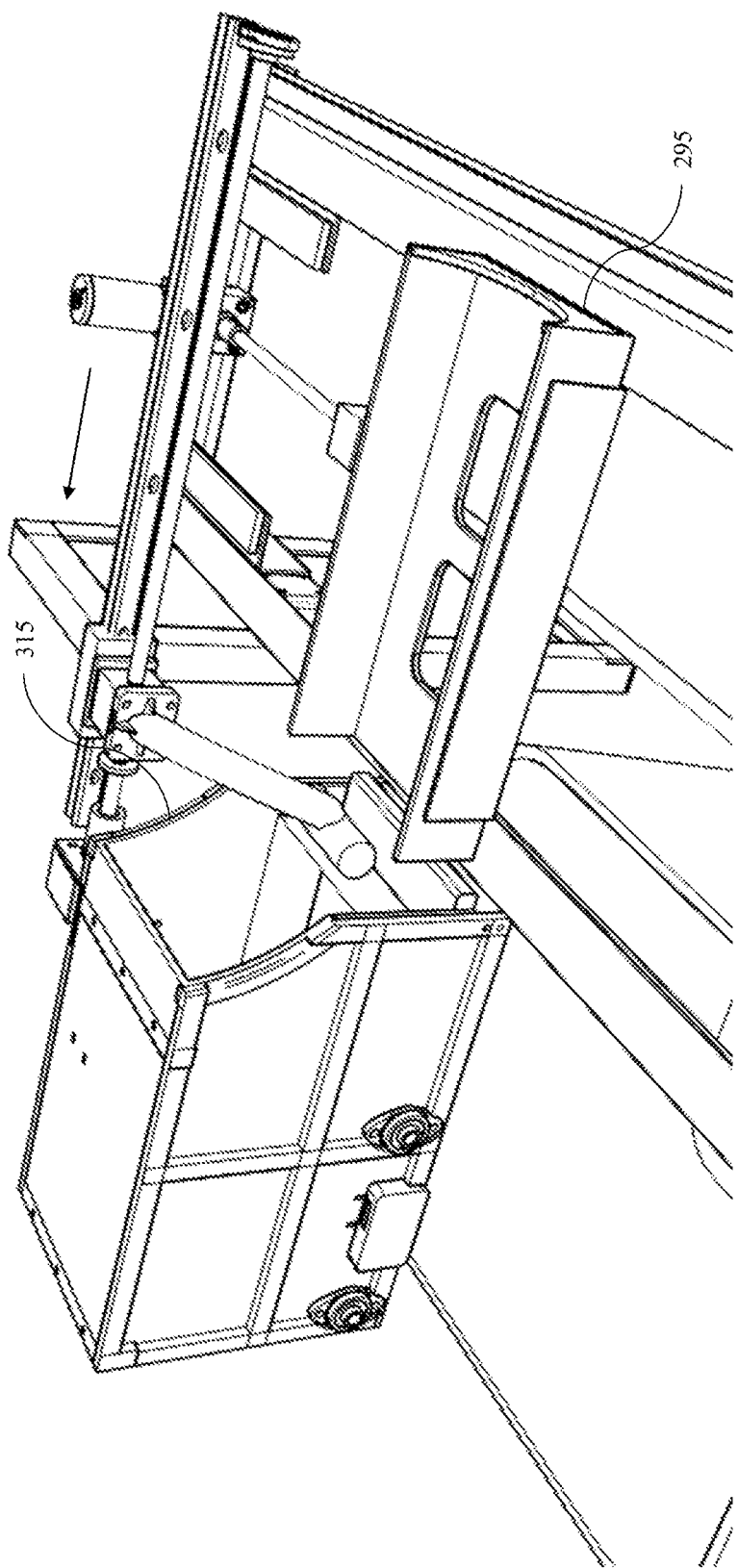
FIG. 45 is a perspective side view of a movable arm moving a food receptacle containing a fully assembled cooked food item into a pickup area first element, wherein the moveable arm is positioned proximate to the pickup area first element, according to an example embodiment of the present invention.
Figures 46, 47, 48:
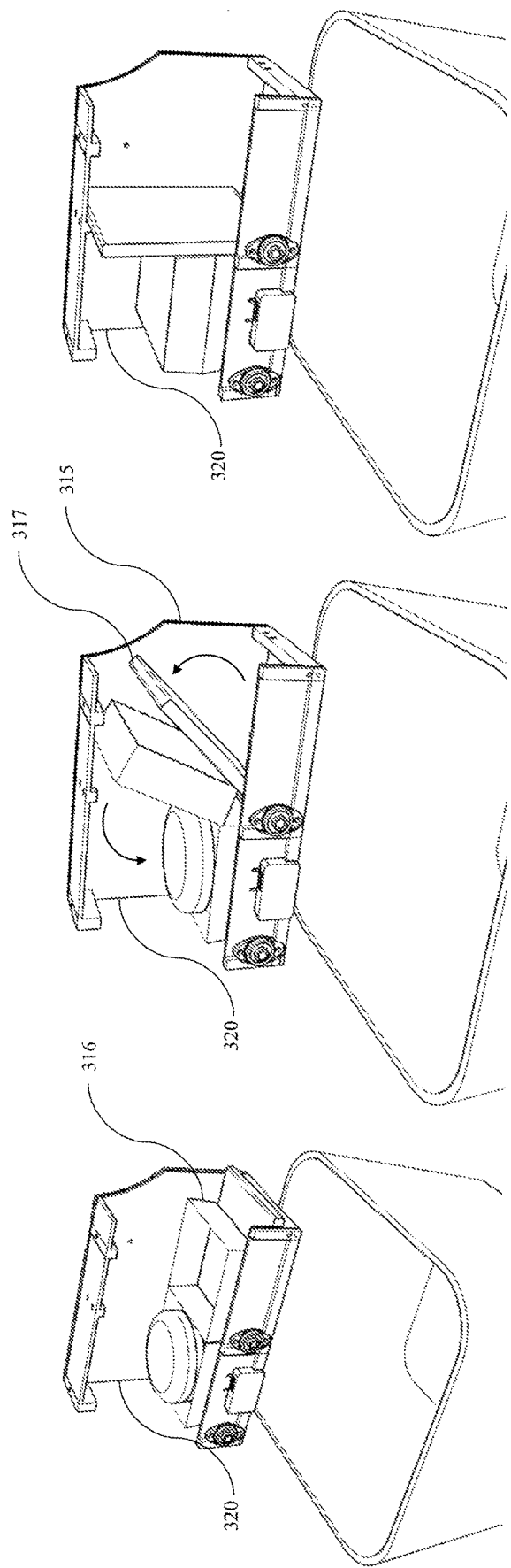
FIG. 46 is a perspective side view of a food receptacle containing a fully assembled cooked food item positioned inside a pickup area first element, according to an example embodiment of the present invention.
FIG. 47 is a perspective side view of a pickup area first element movable panel, wherein the moveable panel is closing a food receptacle containing a fully assembled cooked food item positioned inside a pickup area first element, according to an example embodiment of the present invention.
FIG. 48 is a perspective side view of a pickup area second element, wherein a closed food receptacle containing a fully assembled cooked food item is positioned inside the pickup area second element to be picked up by a consumer, according to an example embodiment of the present invention.

FIGS. 33 and 34 show a movable carrier 295 and at least one movable arm 305 mounted on a track 300 according to an example embodiment of the present invention. The movable carrier 295 is configured to receive the food item components as it moves between a plurality of the assembling areas. The track 300 is configured to allow the movable carrier 295 to translate in a carrier first direction (in the direction of arrowed line D12) and a carrier second direction (in the direction of arrowed line D13). The track further includes at least one movable arm 305 that is configured to move between a rearward position and a forward position. The at least one controller is configured to send a plurality of signals to cause the at least one movable arm 305 to move between the rearward position and the forward position. In the rearward position, as best illustrated in FIG. 44, the at least one movable arm 305 is located on a rearward facing side 301 of the track. In the forward position, as best illustrated in FIG. 45, the at least one movable arm 305 is located proximate to a pickup area 310.

Figure 24:
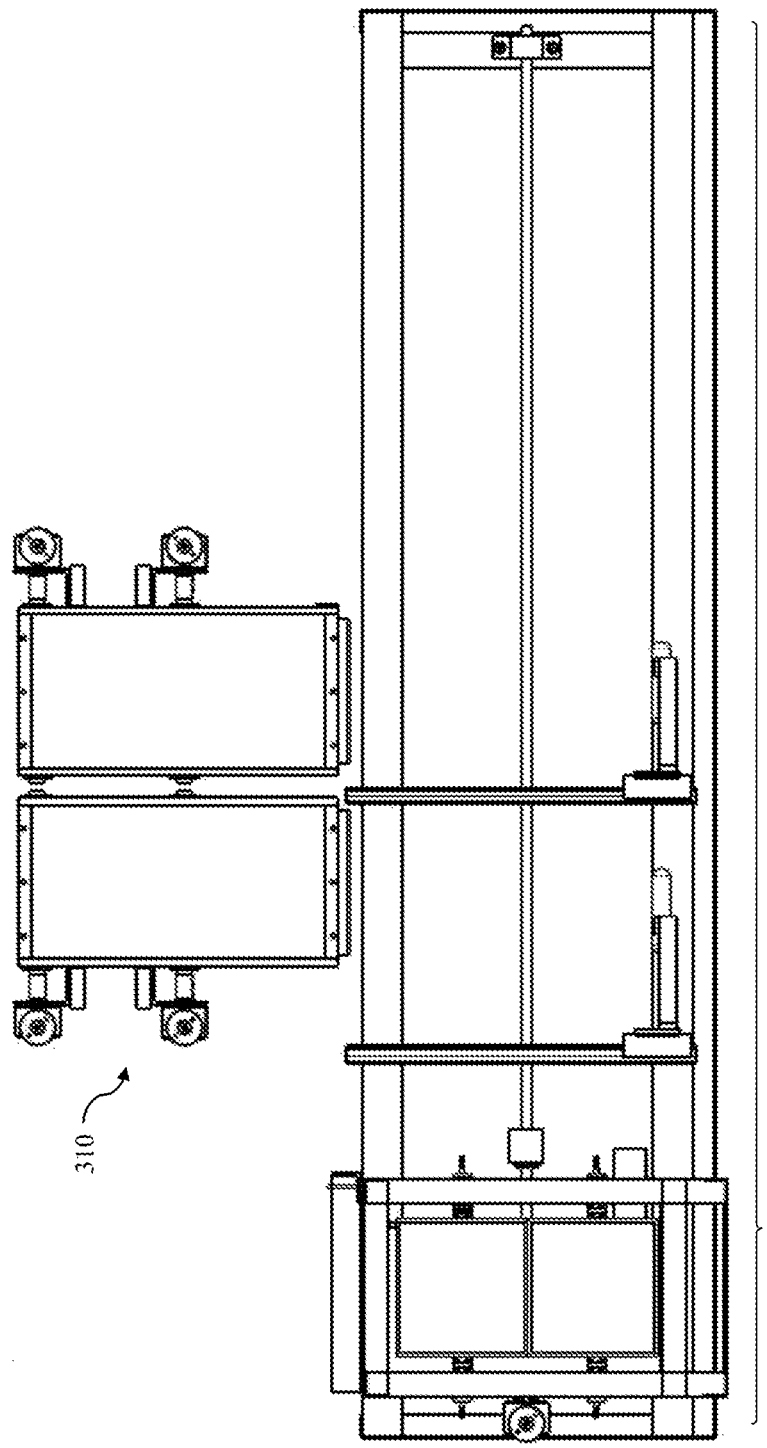
FIG. 24 is a top view of at least one assembling area, according to an example embodiment of the present invention.
Figure 25:
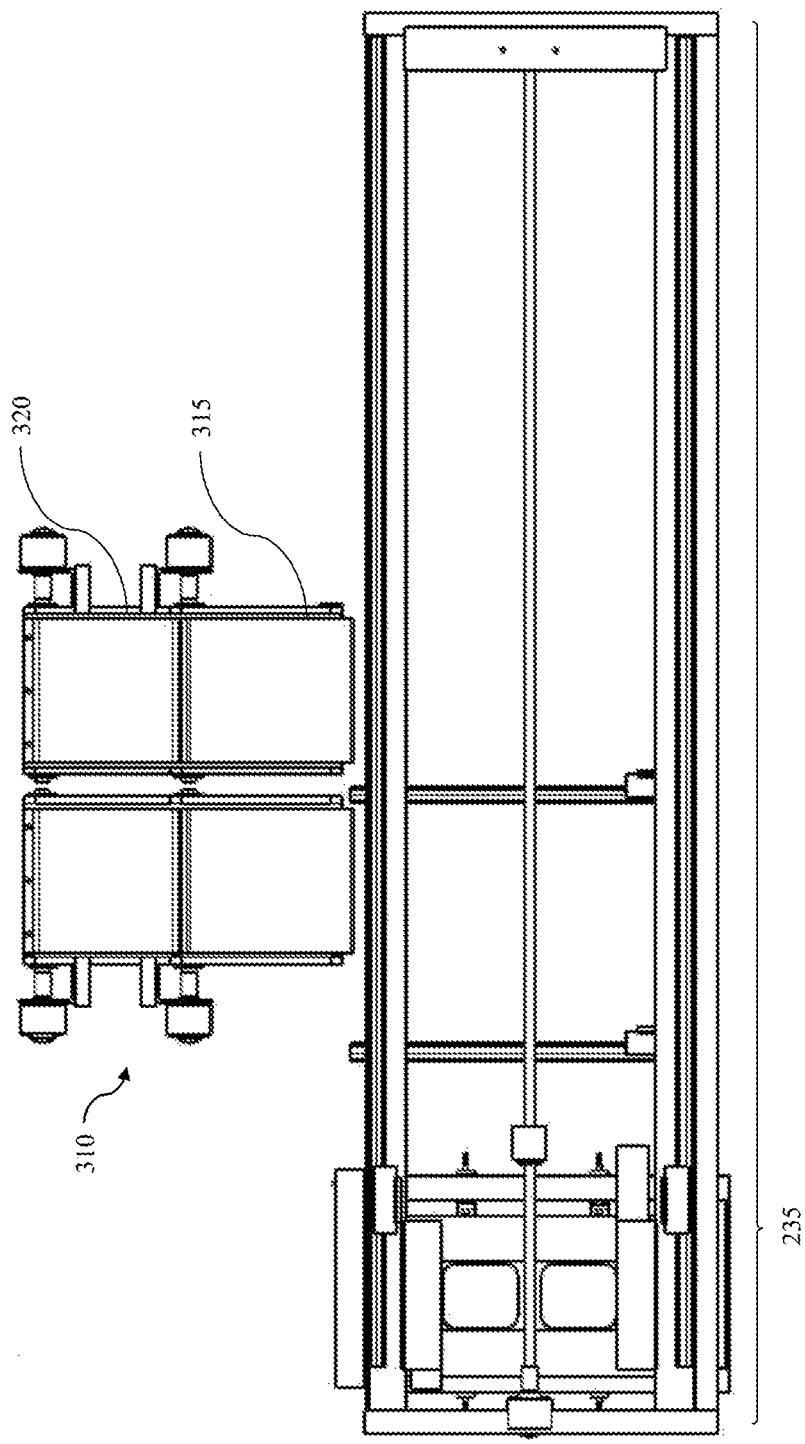
FIG. 25 is a bottom view of at least one assembling area, according to an example embodiment of the present invention.
Figure 26:
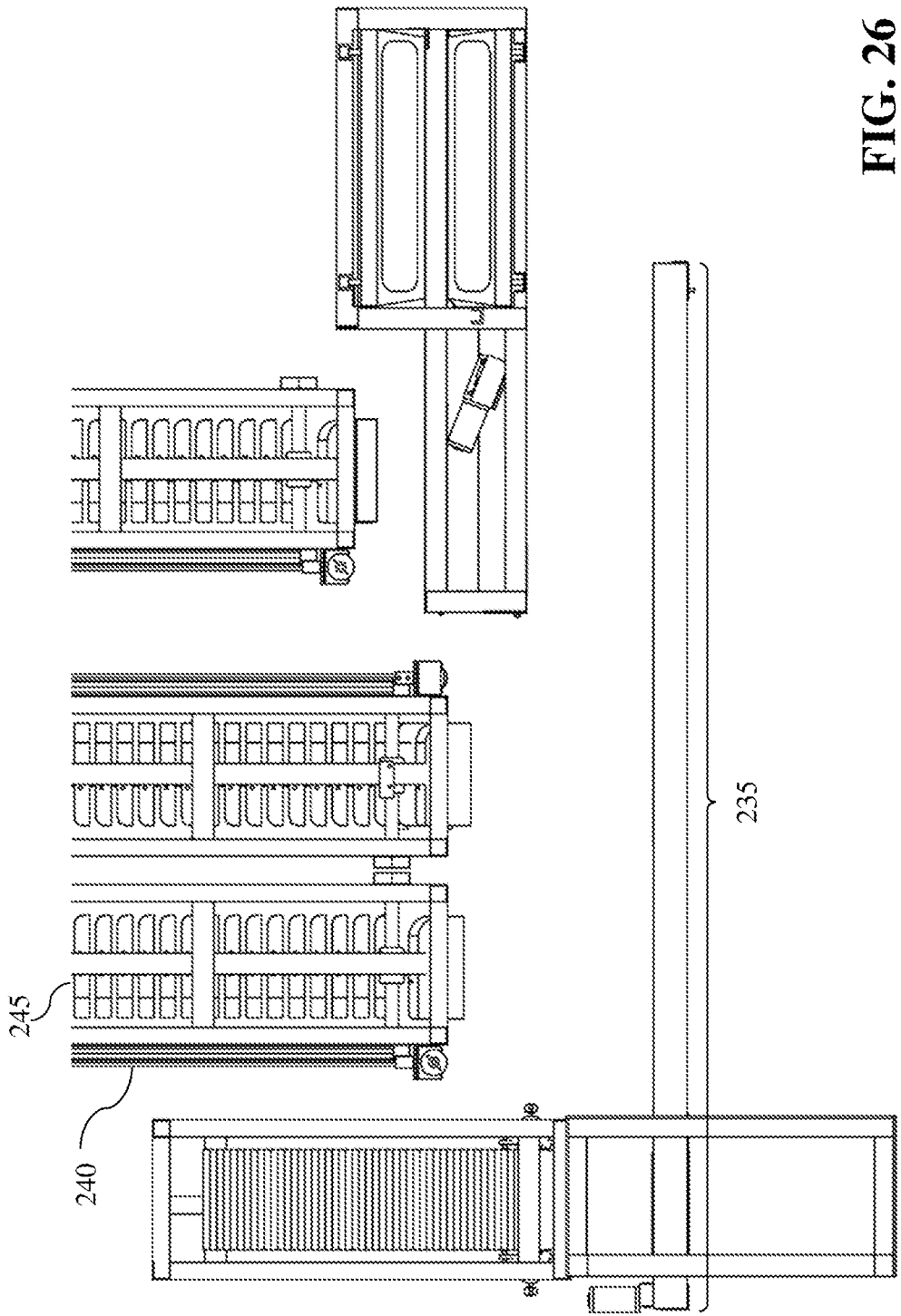
FIG. 26 is a front view of a conveyor system above at least one assembling area, according to an example embodiment of the present invention.
Figure 29:
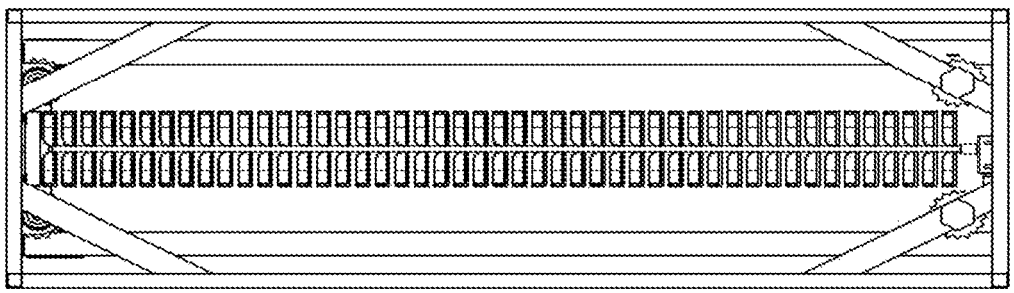
FIG. 29 is a left side view of a vertically stacked movable platform, according to an example embodiment of the present invention.
Figure 28:
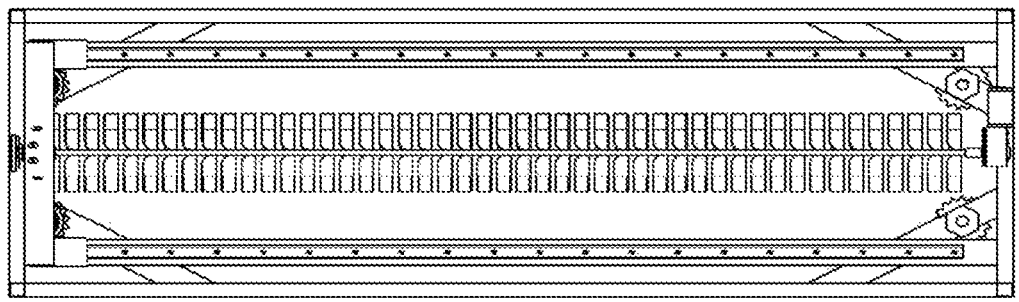
FIG. 28 is a right-side view of a vertically stacked movable platform, according to an example embodiment of the present invention.
Figure 27:
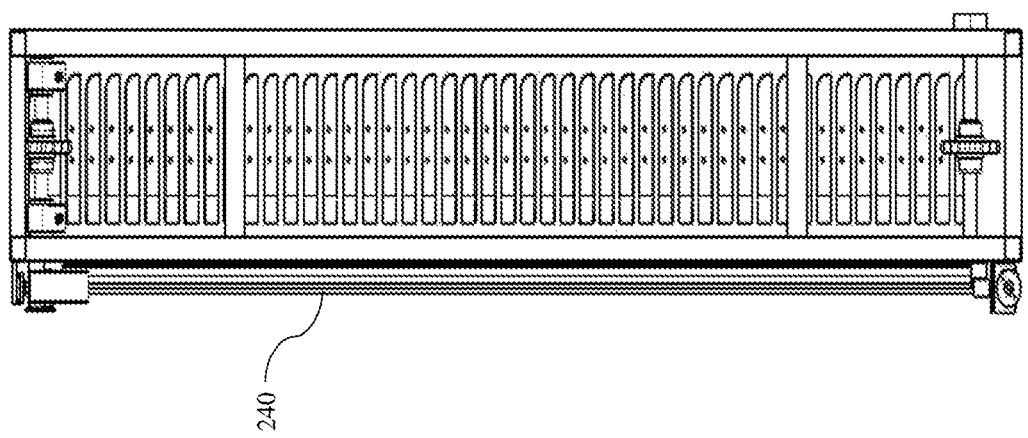
FIG. 27 is a front view of a vertically stacked movable platform, according to an example embodiment of the present invention.

FIGS. 24 and 25 show the pickup area 310 according to an example embodiment of the present invention. The pickup area 310 includes a pickup area first element 315, a pickup area second element 320, and a pickup area third element 325. The pickup area first element 315 is configured to receive at least a fully assembled cooked food item 316. In the present embodiment, the pickup area first element is a first open pickup area positioned in front of and proximate to the track. The pickup area second element 320 is configured to allow the fully assembled cooked food item 316 to be picked up by a consumer. In the present embodiment, the pickup area second element is a second open pickup area positioned proximate to the pickup area first element 315. The pickup area third element 325 configured to allow the fully assembled cooked food item 316 to move to a disposal area 330. In the present embodiment, the pickup area third element is a movable panel positioned above the disposal area 330. The disposal area includes a disposal area first portion 331 and is positioned relative to the pickup area third element such that when the pickup area third element is in an open configuration, the fully assembled cooked food item 316 drops from the pickup area third element into the disposal area first portion. It should be appreciated that the pickup area may have other shapes, dimensions, and surfaces, and such variations are within the spirit and scope of the claimed invention. For example, the pickup area may be a container, partial container, ledge, or surface, that combines the pickup area first element 315, the pickup area second element 320, and the pickup area third element 325. The pickup area may also be other items just as ledges, panels or other bodies. The pickup areas first element, second element and third element may also be a single item (such as a movable ledge). It should also be appreciated that the pickup area may be configured to orient, wrap or close food receptacles having different shapes, dimensions, and configurations, and such variations are within the spirit and scope of the claimed invention.

Figure 53:
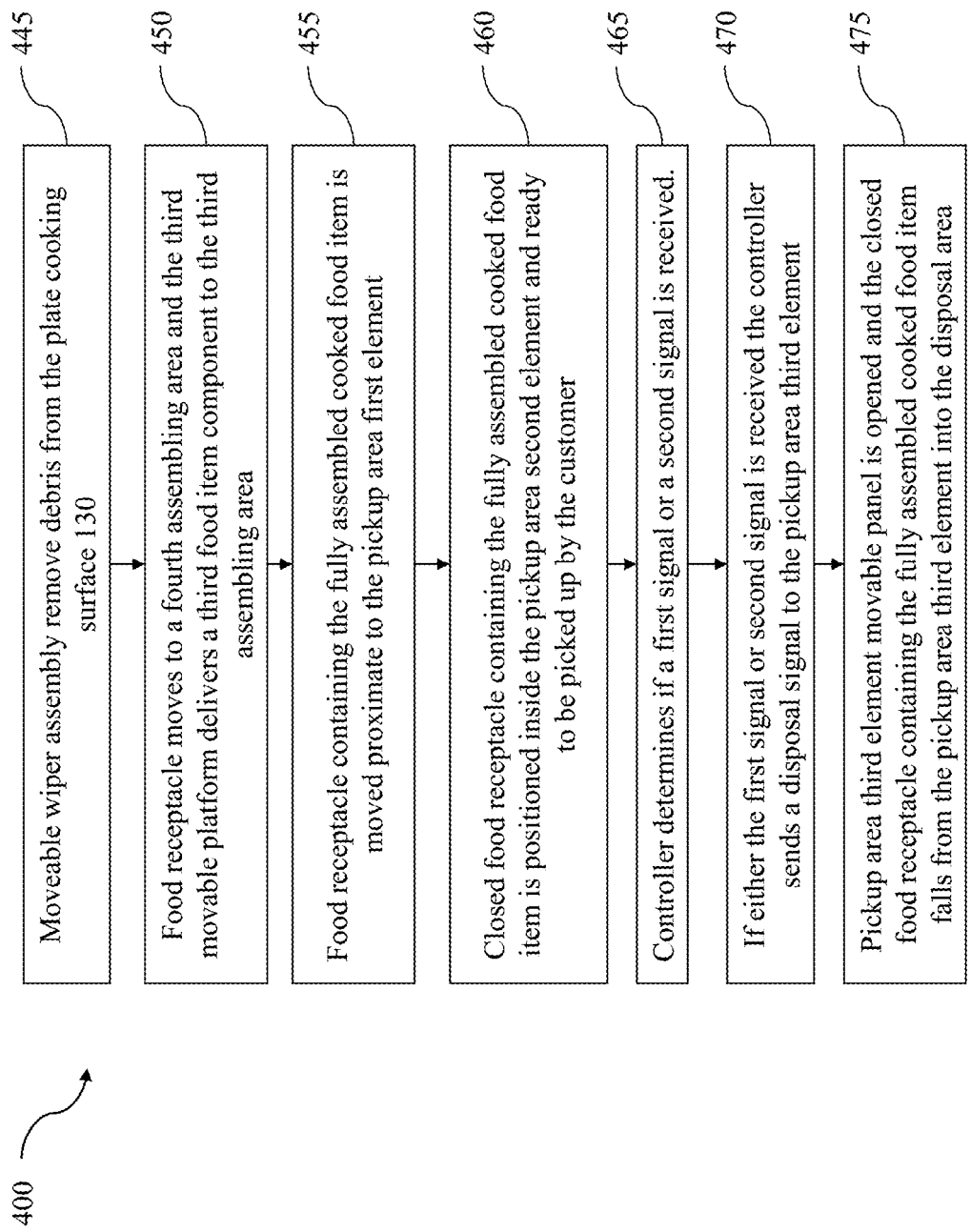
FIG. 53 is a flowchart describing a second set of steps of the process for preparing a cooked food item, according to an example embodiment of the present invention.

FIG. 52 and FIG. 53 are flowcharts describing the steps of the process 400 for preparing a cooked food item, according to an example embodiment of the present invention. The sequence of steps depicted is for illustrative purposes only and is not meant to limit the method in any way as it is understood that the steps may proceed in a different logical order, additional or intervening steps may be included, or described steps may be divided into multiple steps, without detracting from the invention.

Figure 35:
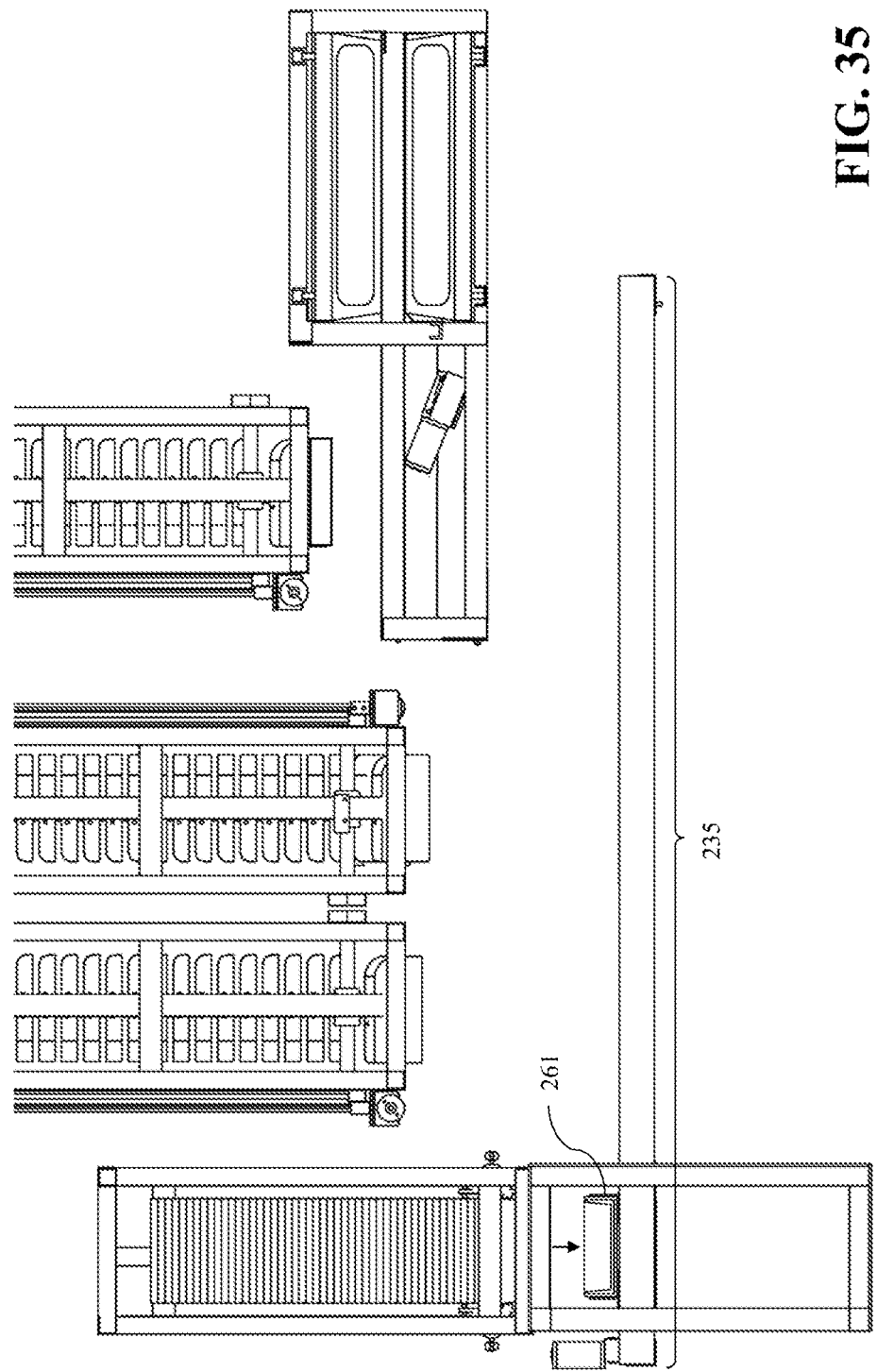
FIG. 35 is a front view of a food receptacle that has been removed from a vertical compartment and subsequently lowered into a first assembling area, according to an example embodiment of the present invention.
Figure 36:
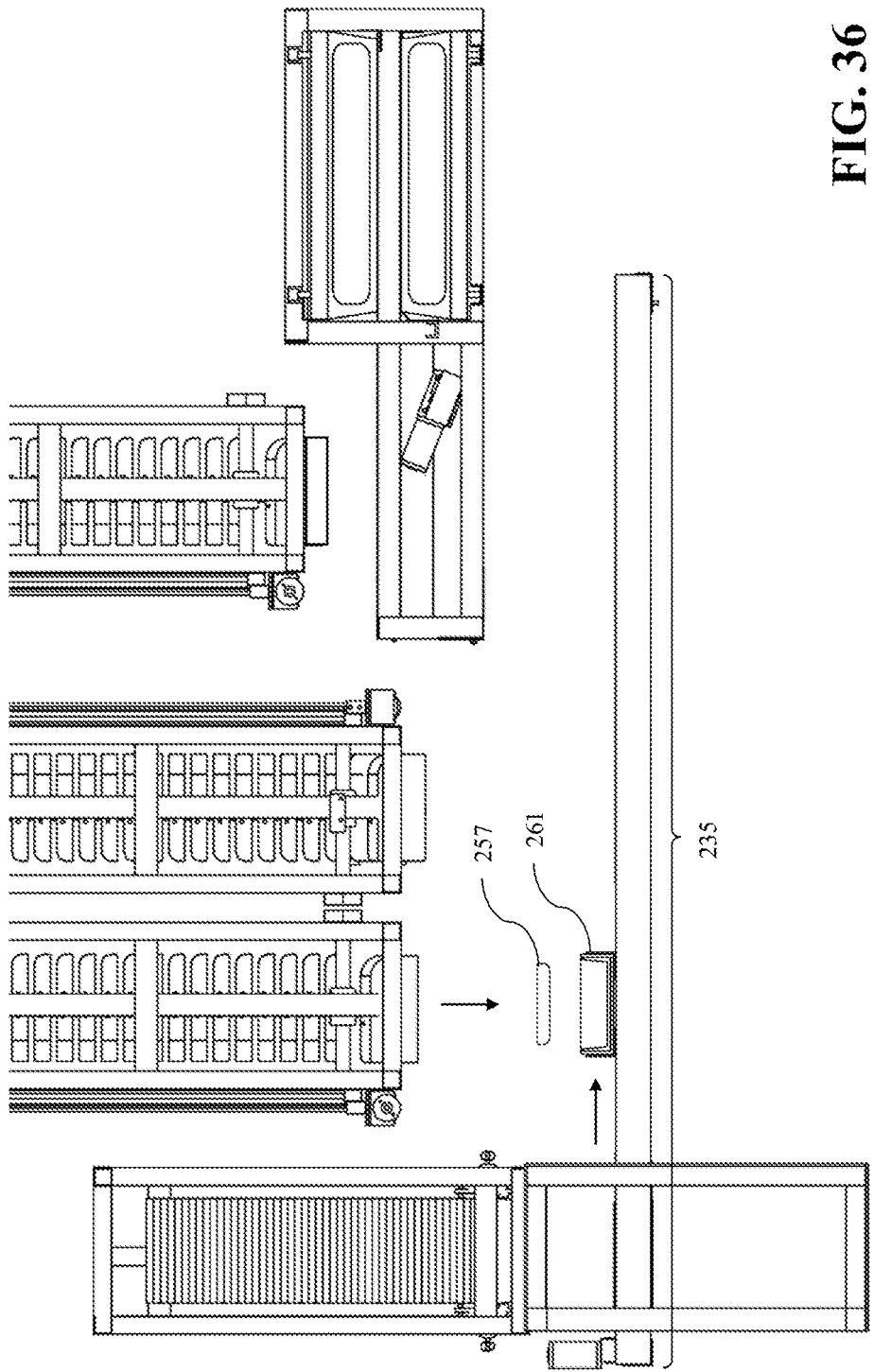
FIG. 36 is a front view of a food receptacle moving to a second assembling area, wherein a first movable platform is delivering a first food item component to the second assembling area, according to an example embodiment of the present invention.

In step 405, the at least one controller receives a food order request from a user. In this step, the user may request a food order in person or utilize a mobile food order application on a mobile device, such as a cell phone, a smart phone, or a tablet/laptop computer to request a food order. In step 410, the food receptacle is removed from the vertical compartment and subsequently lowered into the first assembling area shown in FIG. 35. In step 415, the food receptacle moves to a second assembling area and the first movable platform delivers a first food item component in accordance with the customer order to the second assembling area as shown in FIG. 36.

Figure 37:
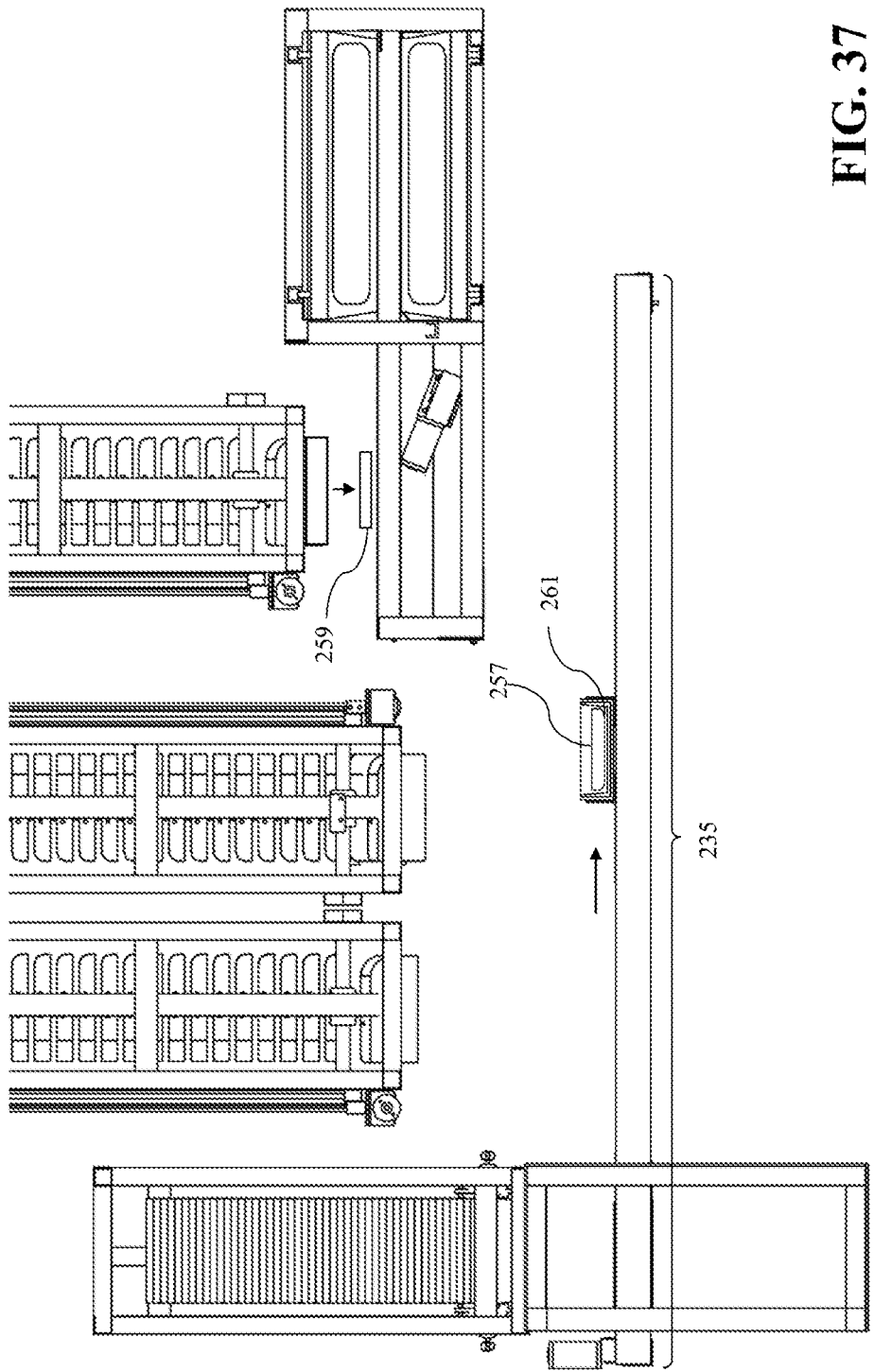
FIG. 37 is a front view of a food receptacle moving to a third assembling area, wherein a second movable platform is delivering a second food item component to a spatula assembly, according to an example embodiment of the present invention.
Figure 38:
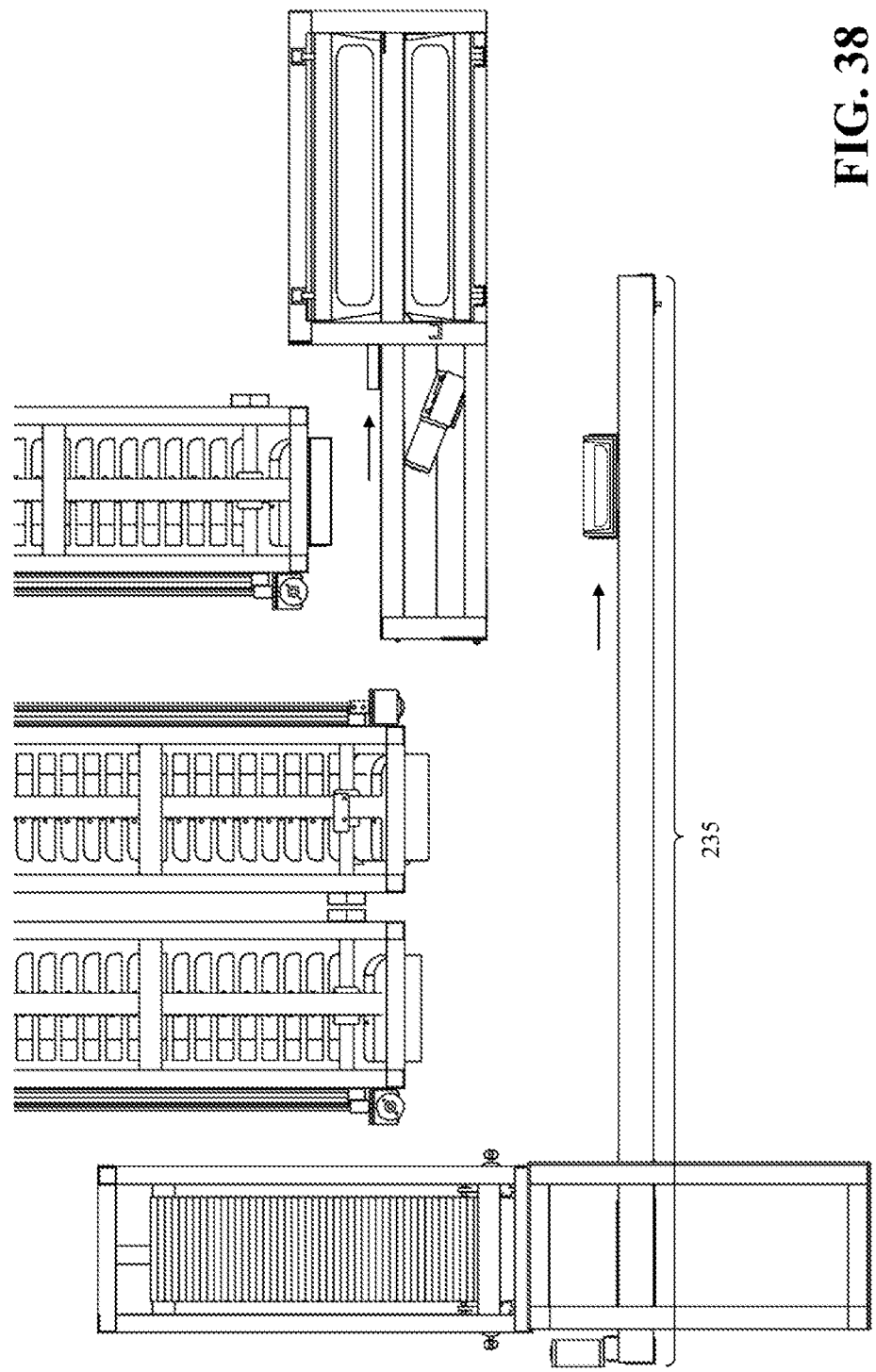
FIG. 38 is a front view of a food receptacle moving to a third assembling area, wherein a spatula assembly is moving a second food item component to an oven assembly, according to an example embodiment of the present invention.
Figure 39:
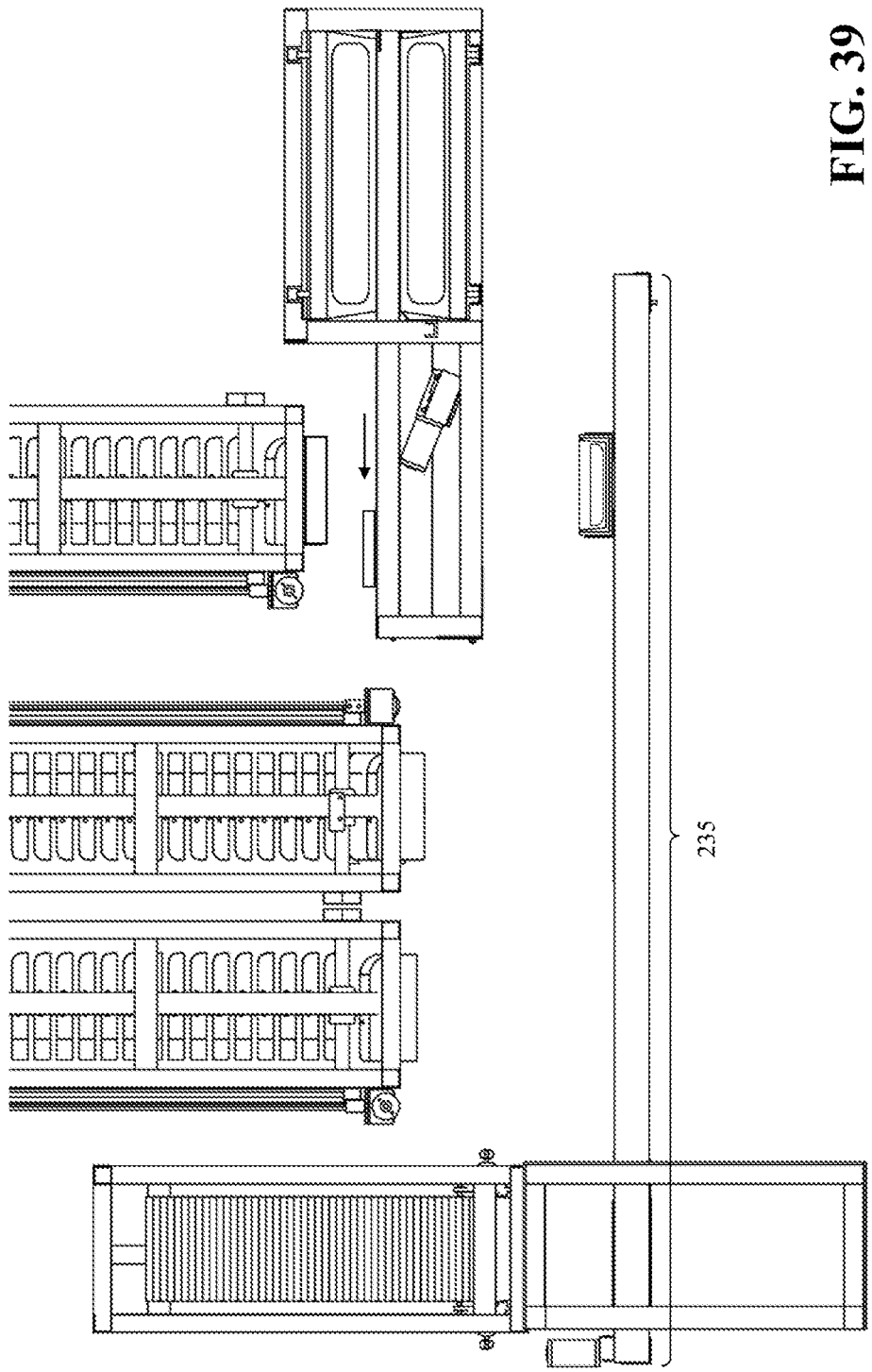
FIG. 39 is a front view of a food receptacle in a third assembling area, wherein a spatula assembly removing a second food item component from an oven assembly, according to an example embodiment of the present invention.
Figure 40:
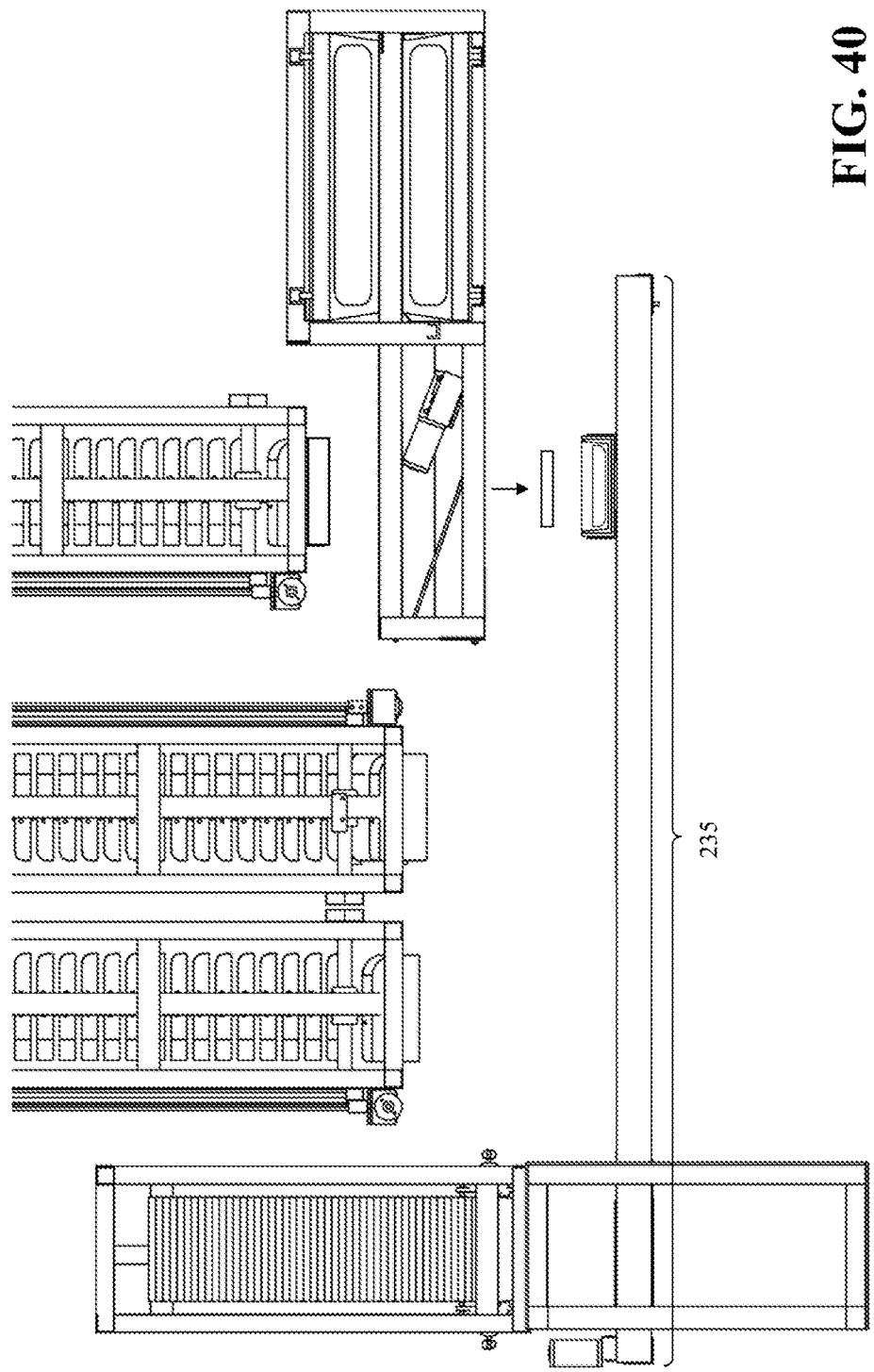
FIG. 40 is a front view of a food receptacle in a third assembling area, wherein a plate in a lower position is delivering a second food item component to the third assembling area, according to an example embodiment of the present invention.

In step 420, the food receptacle moves to a third assembling area and the second movable platform delivers the second food item component to the spatula assembly as shown in FIG. 37. In step 425, the spatula assembly moves the second food item component into the oven assembly to be heated as shown in FIG. 38. In step 430, the spatula assembly removes the heated second food item component from the oven assembly as shown in FIG. 39. In step 435, the telescoping arm assembly is retracted to move the plate from the plate upper position to the plate lower position and the second food item component is delivered to the third assembling area as shown in FIG. 40.

In step 440, the spray assembly 215 sprays cleaning solution onto the cooking area upward facing surface 180, the cooking area downward facing surface 170, and the plate 115. In step 445, the moveable wiper assembly 150 is brought into contact with the plate 115 and the movable wiper cleaning surface 155 oscillates from the first direction (in the direction of arrowed line D4) to the second direction (in the direction of arrowed line D5) as shown in FIGS. 10 and 11, respectively, to remove debris (e.g., food particles, grease, cleaning solution) from the plate cooking surface 130. Additionally, the at least one fixed wiper cleaning surface 210 located along the upward facing side and downward facing side of the elongated bar is pressed against the cooking area upward facing surface 180 and cooking area downward facing surface 170. The fixed wiper 205 pressed against the cooking area upward facing surface 180 and cooking area downward facing surface 170 moves from the spatula assembly cooking position to the spatula assembly non-cooking position to remove and cleans debris from the cooking area upward facing surface 180 and cooking area downward facing surface 170.

Figure 41:
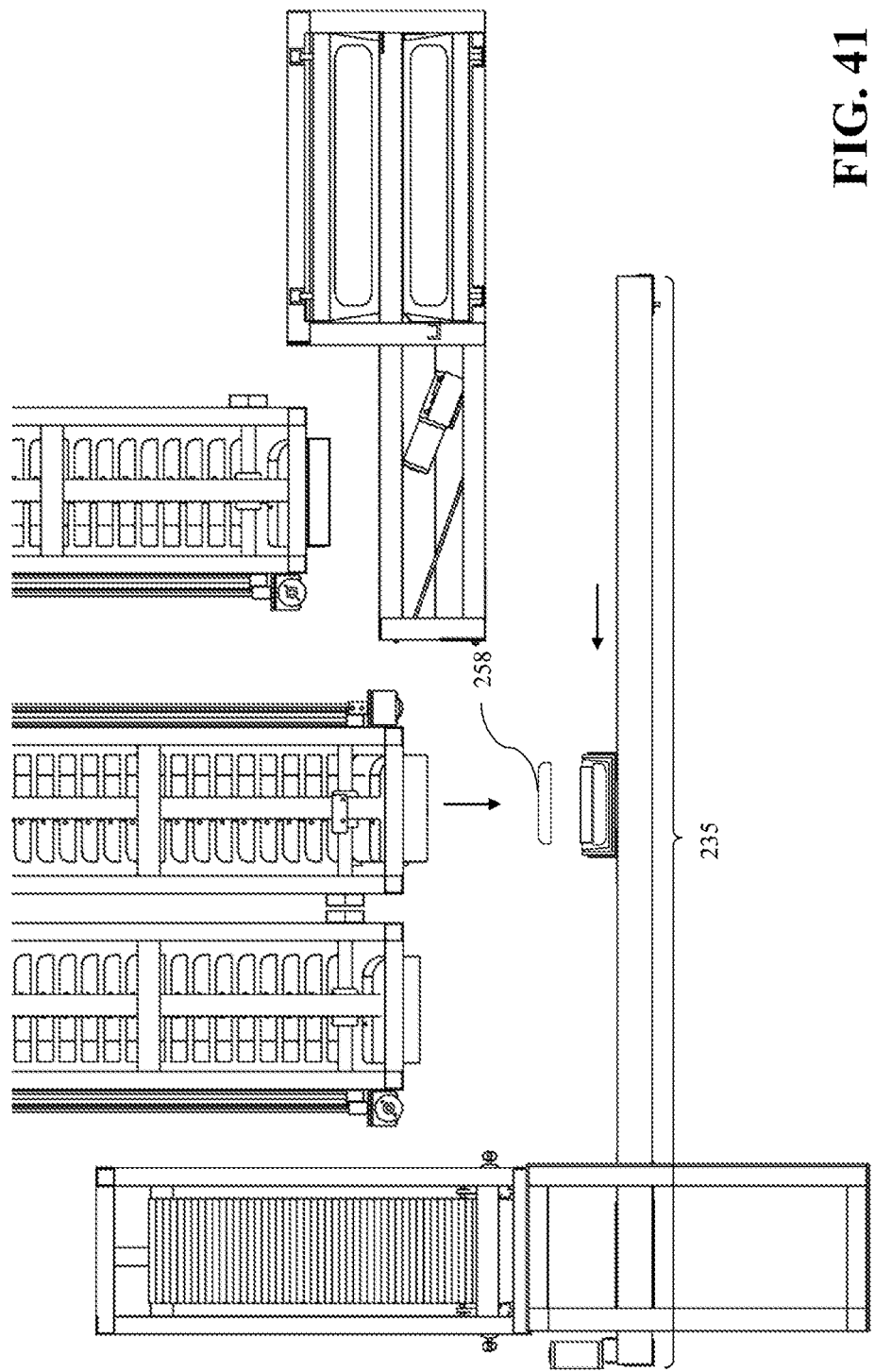
FIG. 41 is a front view of a food receptacle moving to a fourth assembling area, wherein a third movable platform is delivering a third food item component to the third assembling area, according to an example embodiment of the present invention.
Figure 42:
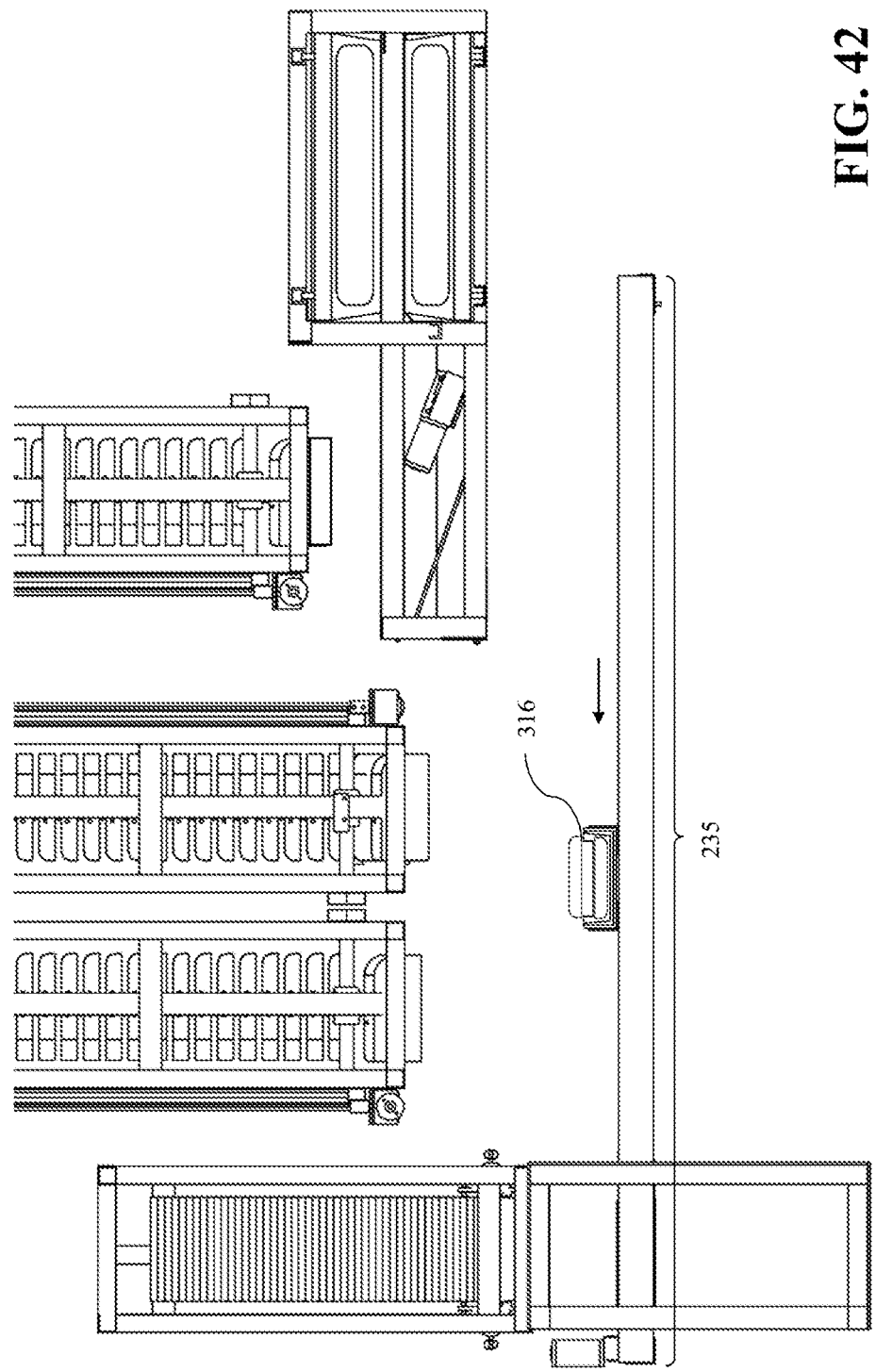
FIG. 42 is a front view of a food receptacle containing a fully assembled cooked food item moving to a pickup area first element, according to an example embodiment of the present invention.
Figure 43:
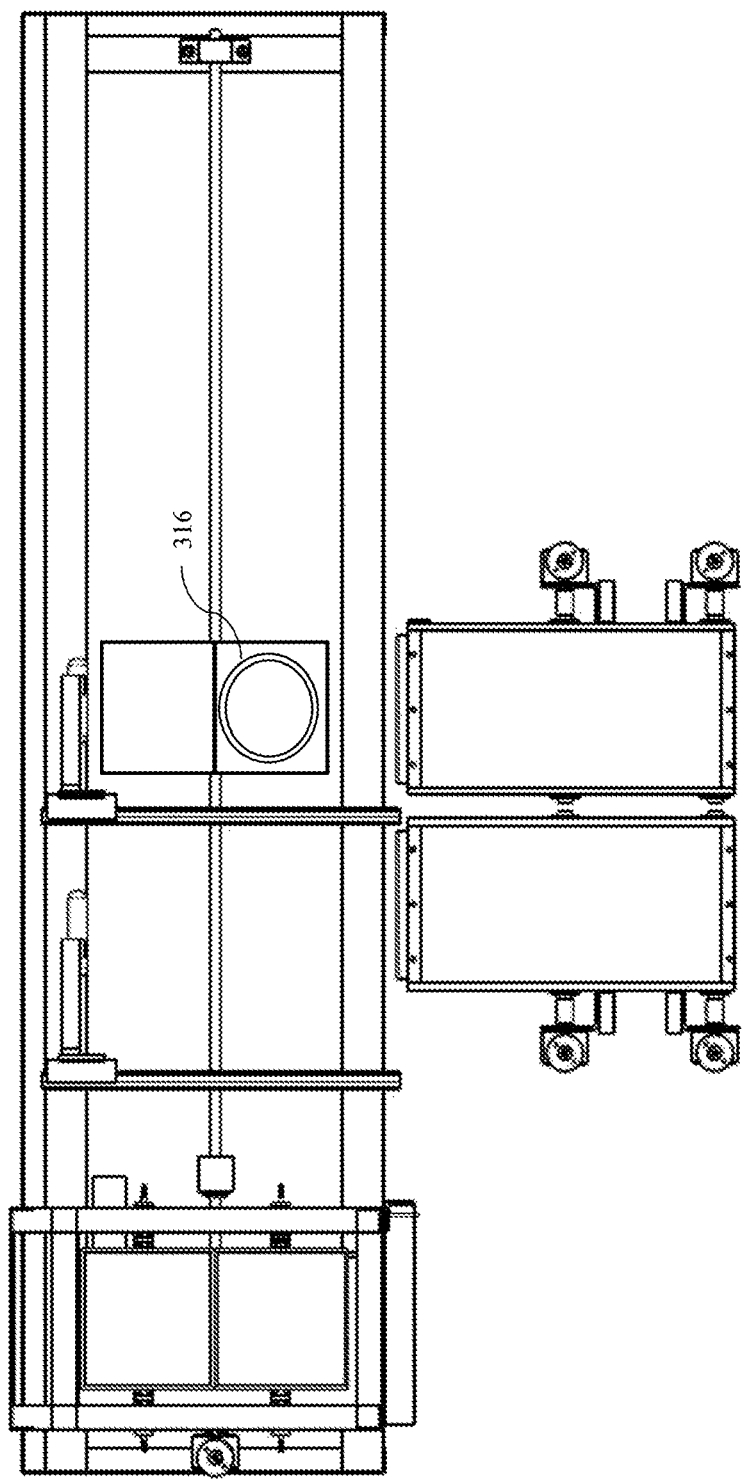
FIG. 43 is a top view of a food receptacle containing a fully assembled cooked food item proximate to a pickup area first element, wherein a movable arm is positioned rearward of a track, according to an example embodiment of the present invention.
Figure 49:
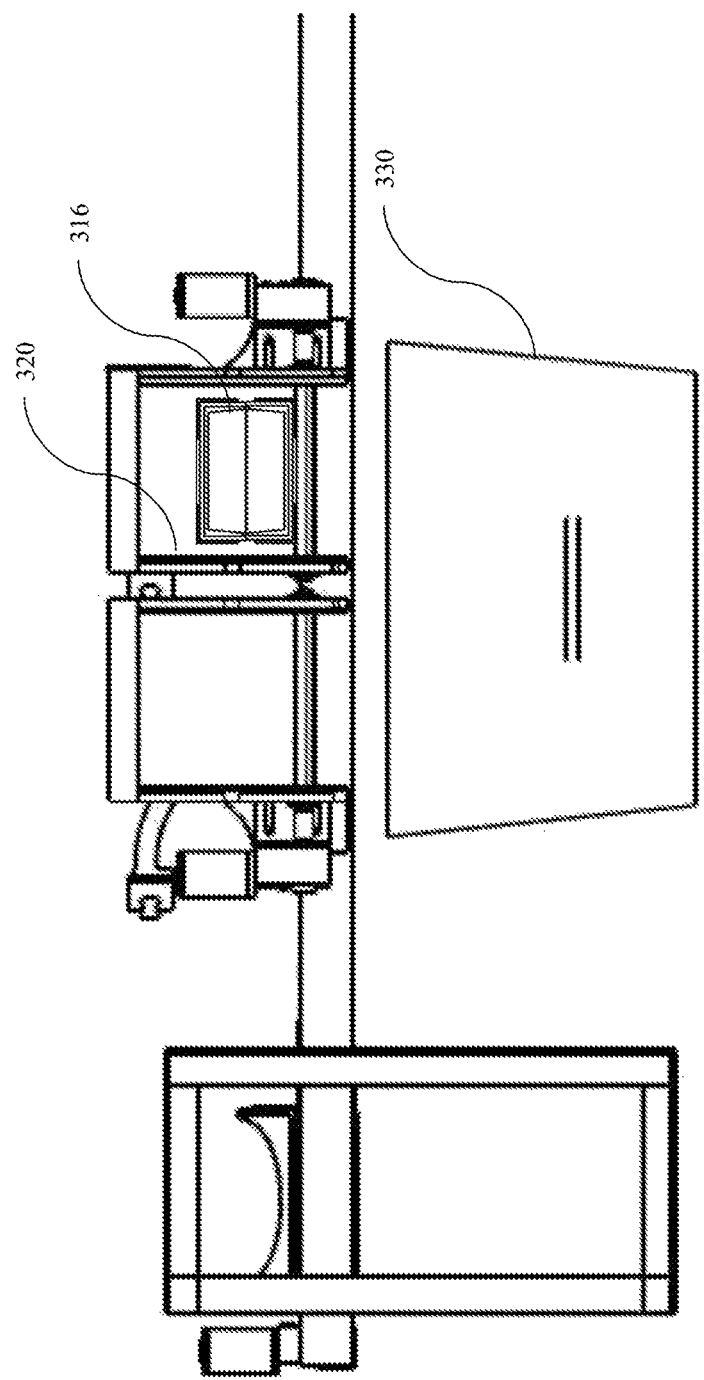
FIG. 49 is a front view of a pickup area second element, wherein a closed food receptacle containing a fully assembled cooked food item is positioned inside the pickup area second element to be picked up by a consumer, according to an example embodiment of the present invention.
Figure 50:
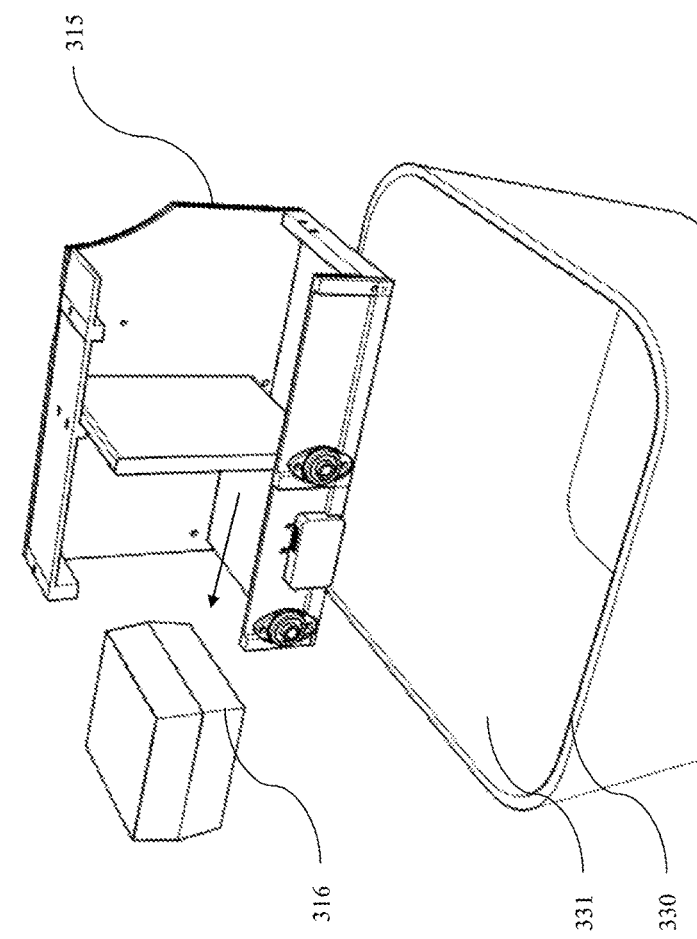
FIG. 50 is a perspective side view of a pickup area second element, wherein a closed food receptacle containing a fully assembled cooked food item is moving out of the pickup area second element, according to an example embodiment of the present invention.

In step 450, the food receptacle moves to a fourth assembling area and the third movable platform delivers a third food item component to the third assembling area as shown in FIG. 41. In step 450, the food receptacle containing the fully assembled cooked food item is moved proximate to the pickup area first element as shown in FIGS. 42 and 43. In step 455, the movable arm moves the fully assembled cooked food item into the pickup area first element and a moveable panel 317 located inside the pickup area first element closes the food receptacle containing the fully assembled cooked food as shown in FIGS. 44-48. In step 460, the closed food receptacle containing the fully assembled cooked food item is positioned inside the pickup area second element and ready to be picked up by the customer as shown in FIGS. 49 and 50.

In step 465, the at least one controller determines if a first signal or a second signal is received. The first signal indicates that the closed food receptacle containing the fully assembled cooked food item inside the pickup area second element has not been removed by the customer within the preprogrammed amount of time. The predetermined amount of time takes into account that another food order is placed and must be moved into the pickup area. The second signal indicates that the closed food receptacle containing the fully assembled cooked food item inside the pickup area second element has not satisfied a specific parameter or condition. For example, the second signal could be a signal that is based on temperature, mechanical malfunction, order cancellation, or *E. coli* determination.

Figure 51:
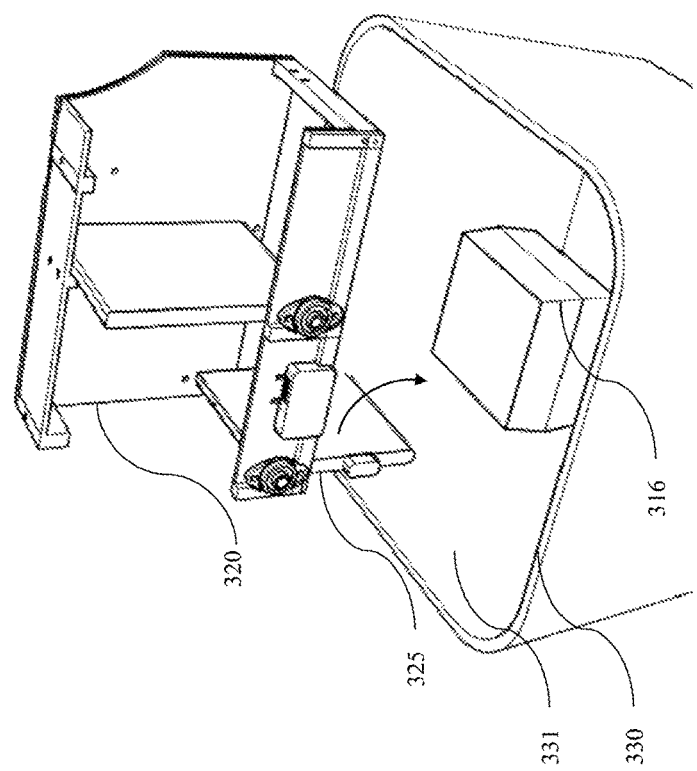
FIG. 51 is a perspective side view of a pickup area third element, wherein a closed food receptacle containing a fully assembled cooked food item is moving to a disposal area, according to an example embodiment of the present invention.

In step 470, if either the first signal or second signal is received, the at least one controller sends a disposal signal to the pickup area third element to move the fully assembled cooked food item 316 to the disposal area. In step 475, the pickup area third element movable panel is opened and the closed food receptacle containing the fully assembled cooked food item falls from the pickup area third element into the disposal area positioned below the pickup area third element as shown in FIG. 51.

Figure 54:
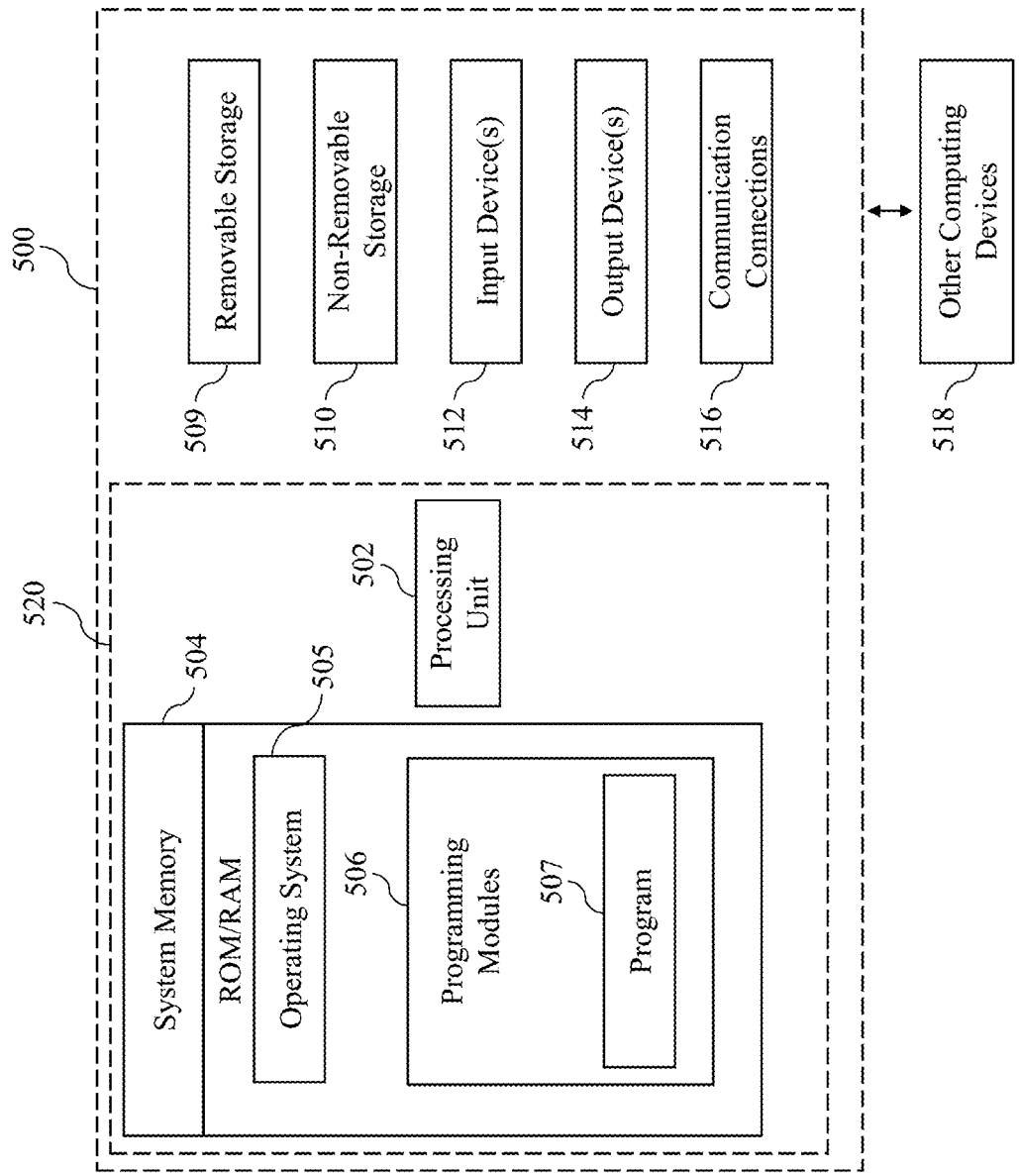
FIG. 54 is a block diagram of a system including an example computing device and other computing devices, according to an example embodiment of the present invention.

FIG. 54 is a block diagram of a system including an example computing device 500 and other computing devices. Consistent with the embodiments described herein, the aforementioned actions may be implemented in a computing device, such as the computing device of FIG. 54. Any suitable combination of hardware, software, or firmware may be used to implement the computing device. The aforementioned system, device, and processors are examples and other systems, devices, and processors may comprise the aforementioned computing device.

With reference to FIG. 54, a system consistent with an embodiment of the invention may include a plurality of computing devices, such as computing device 500. In a basic configuration, computing device may include at least one processing unit 502 and a system memory 504. Depending on the configuration and type of computing device, system memory 504 may comprise, but is not limited to volatile (e.g. random-access memory (RAM)), non-volatile (e.g. read-only memory (ROM)), flash memory, or any combination or memory. System memory 504 may also include operating system 505, and one or more programming modules 506 (such as program module 507). Operating system 505, for example, may be suitable for controlling the operation of computing device 500. In one embodiment, programming modules 506 may include, for example, a program module 507. Furthermore, embodiments of the invention may be practiced in conjunction with a graphics library, other operating systems, or any other application program and is not limited to any particular application or system. This basic configuration is illustrated in FIG. 52 by those components within a dashed line 520.

Computing device 500 may have additional features or functionality. For example, computing device 500 may also include additional data storage devices (removable and/or non-removable) such as, for example, magnetic disks, optical disks, or tape. Such additional storage is illustrated in FIG. 54 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of computing device 500. Computing device 500 may also have input device(s) 512 such as a keyboard, a mouse, a pen, a sound input device, a camera, a touch input device, etc. Output device(s) 514 such as a display, audio speakers, or printer, may also be included. The aforementioned devices are only examples, and other devices may be added or substituted.

Computing device 500 may also contain a communication connection 516 that may allow computing device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media, such as a wired network or direct-wired connection, and wireless media, such as acoustic, radio frequency (RF), infrared, and other wireless media. The term computer readable media as used herein may include both, computer storage media and communication media.

As stated above, a number of program modules and data files may be stored in system memory 504, including operating system 505. While executing on processing unit 502, programming modules 506 may perform processes including, for example, one or more of the methods and steps shown in FIG. 52 and FIG. 53. Computing device 500 may also include a graphics processing unit, which supplements the processing capabilities of processor 502 and which may execute programming modules 506, including all or a portion of those processes and methods shown in FIGS. 52 and 53. The aforementioned processes are examples, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An apparatus housed within an enclosed frame structure for preparing cooked food comprising:
    a spatula assembly comprising a plate having a plate first end portion, a plate second end portion, a plate cooking surface and a plate non-cooking surface;
    wherein the plate first end portion is pivotally in attachment with a cross member, and wherein the plate rotates relative to the cross member between a plate upper position and a plate lower position, wherein an elongated assembly is movably engaged to the plate non-cooking surface to move the plate, and wherein the plate is outside a cooking area when the plate is in the plate lower position; and,
    a movable wiper assembly defining an elongated body having a movable wiper cleaning surface along the elongated body, the elongated body having an elongated body first end pivotally attached to a pivoting element such that the elongated body rotates traverse and non-linearly cross the plate cooking surface when the plate is in the plate lower position;
    an at least one fixed oven assembly having an open first end providing access to the cooking area, the cooking area positioned between an oven fixed upper part having a cooking area downward facing surface and an oven fixed lower part having a cooking area upward facing surface where a fixed oven upper part and a fixed oven lower part are fixed relative to each other;
    wherein the spatula assembly moves linearly between a cooking position and a non-cooking position;
    wherein in the cooking position the plate is positioned in the cooking area between the cooking area downward facing surface and the cooking area upward facing surface; and,
    wherein in the non-cooking position the plate is positioned outside the cooking area outside the open first end of the at least one fixed oven assembly and not between the cooking area downward facing surface and the cooking area upward facing surface.

2. The apparatus housed within the enclosed frame structure for preparing cooked food of claim 1, further comprising:
    a retaining member attached to the cross member and above the plate such that a first longitudinal axis of the retaining member is perpendicular and substantially in line with a second longitudinal axis of the cross member;
    a retaining member opening within a perimeter of the retaining member;
    wherein substantially all of the retaining member opening is positioned in the cooking area between the cooking area downward facing surface and the cooking area upward facing surface of the at least one fixed oven assembly when the plate is in the plate cooking position, and such that substantially all of the retaining member opening is positioned outside the open first end of the at least one fixed oven assembly and not between the cooking area downward facing surface and the cooking area upward facing surface when the plate is in the non-cooking position;
    wherein in the plate upper position the plate second end portion is next to the retaining member; and,
    wherein in the plate lower position the plate second end portion is separated apart from the retaining member.

3. The apparatus housed within the enclosed frame structure for preparing cooked food of claim 1 further comprising:
    a fixed wiper defined by an elongated bar having at least one fixed wiper cleaning surface, wherein the fixed wiper is in attachment with the cross member;
    wherein the at least one fixed wiper cleaning surface engages at least one of the cooking area upward facing surface and the cooking area downward facing surface such that the fixed wiper cleans at least one of the cooking area upward facing surface and cooking area downward facing surface when the fixed wiper linearly translates between a) outside the open first end of the at least one fixed oven assembly and not between the cooking area downward facing surface and the cooking area upward facing surface and b) between the cooking area downward facing surface and the cooking area upward facing surface of the fixed oven assembly.

4. The apparatus housed within the enclosed frame structure for preparing cooked food of claim 3, wherein the elongated bar is attached to an end of the retaining member.

5. The apparatus housed within the enclosed frame structure for preparing cooked food of claim 3 further comprising at least one spray assembly having at least one nozzle attached to a fixed oven assembly second end wherein the at least one spray assembly is configured to spray cleaning solution on at least one of the cooking area upward facing surface, the cooking area downward facing surface and the plate.

6. The apparatus housed within the enclosed frame structure for preparing cooked food of claim 1, wherein the apparatus further comprises:

a pickup area having a pickup area first element configured to receive a least a fully assembled cooked food item, a pickup area second element configured to allow the fully assembled cooked food item to be picked up by a consumer, and a pickup area third element configured to allow the fully assembled cooked food item to move to a disposal area;

the disposal area having a disposal area first portion and positioned relative to the pickup area third element so that the fully assembled cooked food item may exit the pickup area third element and into the disposal area first portion when the pickup area third element is in an open configuration.

7. The apparatus housed within the enclosed frame structure for preparing cooked food of claim 6, wherein the pickup area first element is a first open pickup area, the pickup area second element is a second open pickup area, and the pickup area third element is a movable panel; and, wherein the pickup area third element moves the fully assembled cooked food item to move into the disposal area.

8. The apparatus housed within the enclosed frame structure for preparing cooked food of claim 1, wherein the apparatus further includes:

a movable carrier mounted within apparatus;

a track on which said movable carrier can translate in a carrier first direction and a carrier second direction between a plurality of assembling areas;

the pickup area first element positioned in front of and proximate to the track;

at least one movable arm configured to move between a rearward position and a forward position, wherein in the rearward position the at least one movable arm is rearward of the track and wherein in the forward position the at least one movable arm is positioned proximate to the pickup area first element.

9. The apparatus housed within the enclosed frame structure for preparing cooked food of claim 1, wherein the apparatus further comprises:

at least one assembling area;

a conveyor system above each assembling area for storing and delivering a food item component to one of the plurality of assembling areas;

the conveyor system having a first column of movable doors and an opposing second column of movable doors, wherein each door has a free end not attached to the conveyor system and a non-free end attached to the conveyor system;

wherein the conveyor system defines a plurality of vertically stacked movable platforms;

where each movable platform is formed by a pair of said movable doors being horizontally aligned, where the first of said pair of horizontally aligned doors being from the first column of movable doors and the second of said pair of horizontally aligned doors being from the second column of movable doors, and where the free ends of each of said pair of movable doors are proximate each other and the non-free ends being distal from each other; and wherein the free ends of the movable doors rotate down and outward away from each other at a bottom end of portion of a conveyer system such that the food item component moves into the assembling area below the conveyer system.

* * * * *